(12) United States Patent
Miki et al.

(10) Patent No.: US 8,746,106 B2
(45) Date of Patent: Jun. 10, 2014

(54) BICYCLE OPERATING DEVICE

(75) Inventors: Yoshimitsu Miki, Osaka (JP); Atsuhiro Emura, Osaka (JP); Kazutaka Fukao, Osaka (JP); Kazunori Ookubo, Osaka (JP)

(73) Assignee: Shimano Inc., Osaka (JP)

( * ) Notice: Subject to any disclaimer, the term of this patent is extended or adjusted under 35 U.S.C. 154(b) by 299 days.

(21) Appl. No.: 13/415,008

(22) Filed: Mar. 8, 2012

(65) Prior Publication Data
US 2013/0233112 A1 Sep. 12, 2013

(51) Int. Cl.
*B62M 25/04* (2006.01)
*B62K 23/06* (2006.01)

(52) U.S. Cl.
USPC ............. 74/502.2; 74/501.6; 74/489; 74/486

(58) Field of Classification Search
USPC ............. 74/502.2, 501.6, 488, 489, 485, 486
See application file for complete search history.

(56) References Cited

U.S. PATENT DOCUMENTS

| | | | | |
|---|---|---|---|---|
| 3,934,492 A * | 1/1976 | Timbs | | 475/210 |
| 5,257,683 A | 11/1993 | Romano | | |
| 5,400,675 A | 3/1995 | Nagano | | |
| 5,479,776 A * | 1/1996 | Romano | | 74/502.2 |
| 5,957,002 A * | 9/1999 | Ueng | | 74/502.2 |
| 7,628,095 B2 * | 12/2009 | Funai | | 74/502.2 |
| 7,650,813 B2 * | 1/2010 | Tsumiyama | | 74/502.2 |
| 7,665,383 B2 * | 2/2010 | Kawakami | | 74/502.2 |
| 7,721,621 B2 * | 5/2010 | Kawakami | | 74/502.2 |
| 7,762,157 B2 * | 7/2010 | Kawakami | | 74/502.2 |
| 7,849,765 B2 * | 12/2010 | Kawakami | | 74/502.2 |
| 7,882,763 B2 * | 2/2011 | Kawakami | | 74/502.2 |
| 7,895,914 B2 * | 3/2011 | Righi et al. | | 74/502.2 |
| 7,918,145 B1 * | 4/2011 | Calendrille, Jr. | | 74/502.2 |
| 8,069,749 B2 * | 12/2011 | Shahana et al. | | 74/502.2 |
| 8,181,553 B2 * | 5/2012 | Tsumiyama | | 74/502.2 |
| RE43,501 E * | 7/2012 | Dal Pra' | | 192/217 |
| 8,297,143 B2 * | 10/2012 | Fujii et al. | | 74/473.13 |
| 8,375,823 B2 * | 2/2013 | Funai | | 74/502.2 |
| 8,375,824 B2 * | 2/2013 | Miki | | 74/502.2 |
| 8,424,414 B2 * | 4/2013 | Dal Pra | | 74/502.2 |
| 8,485,060 B2 * | 7/2013 | Emura et al. | | 74/473.14 |
| 8,534,156 B2 * | 9/2013 | Miki et al. | | 74/502.2 |
| 8,549,955 B2 * | 10/2013 | Sato et al. | | 74/502.2 |
| 8,549,956 B2 * | 10/2013 | Miki et al. | | 74/502.2 |
| 8,550,942 B2 * | 10/2013 | Oda et al. | | 474/81 |
| 8,584,550 B1 * | 11/2013 | Calendrille, Jr. | | 74/502.2 |
| 2007/0012137 A1 | 1/2007 | Dal Pra' | | |

* cited by examiner

*Primary Examiner* — David M Fenstermacher
(74) *Attorney, Agent, or Firm* — Global IP Counselors

(57) ABSTRACT

A bicycle operating device operates a bicycle component by moving a winding member that moves a take-up member relative to a fixed member in first and second directions. A positioning member is movably arranged with respect to the fixed member between a non-holding position and a holding position to selectively engage a positioning ratchet that is fixed to the take-up member. In the holding position, the positioning member prevents the take-up member from moving in the second direction by selectively engaging one of at least three engaging portions of the positioning ratchet. A preventing member is movably arranged with respect to the positioning ratchet such that the preventing member prevents the positioning member from engaging an intermediate engaging portion of the positioning ratchet while the winding member moves the take-up member in the first direction.

13 Claims, 27 Drawing Sheets

BICYCLE OPERATING DEVICE

BACKGROUND

1. Field of the Invention

This invention generally relates to a bicycle operating device. More specifically, the present invention relates to a bicycle operating device that is operates a bicycle component using a control cable.

2. Background Information

Bicycle operating devices are used to shift gears of a multi-speed bicycle transmission. The multi-speed bicycle transmission typically includes a chain, one or more front sprockets or gears mounted to a front crankset and a plurality of rear sprockets or gears mounted to a rear hub of a rear wheel. The front and rear shift operating devices are designed to operate gear changing devices (e.g., a derailleur or an internal hub gear mechanism) to select a desired gear ratio. A pedaling force from the rider is transferred from the front sprockets to the rear sprockets via the chain for turning the rear wheel.

Most mechanical brake/shift operating devices use control cables that connects the brake/shift operating devices to the brake devices for braking and the gear changing devices for shifting. These control cables are typically Bowden type cables with an outer case and an inner wire. For shifting, a shift lever is usually used for operating the gear changing device. For example, the brake lever is also used as one of the shift lever for pulling the shift cable, while a separate lever is provided for releasing the shift cable. An operating force is typically applied by one of the rider's fingers to operate the shift levers, which in turn transmits the operating force to the shift cable via a shift operating unit. In many cases, the shift operating unit has a shift cable take-up spool. The inner wire of the shift cable is attached at one end to the cable take-up spool and its other end is attached to a part of a gear changing device such as a derailleur or an internal hub gear mechanism. The inner wire of the shift cable is wrapped (pulled) or unwrapped (released) about a peripheral edge of the shift cable take-up spool of the shift operating unit to pull and release the inner wire. By rotating the cable take-up spool, the inner wire slides within the outer case to pull or release the inner wire that operates the gear changing device. In the case of road shifters (e.g., brake/shift operating devices), the shift cable is typically routed along the handlebar. Examples of brake/shift operating devices are disclosed in U.S. Pat. No. 5,400,675 to Nagano (assigned to Shimano, Inc.), U.S. Pat. No. 5,257,683 to Romano (assigned to Campagnolo) and U.S. Publication Patent No. 2007-0012137 to Dal Pra' (assigned to Campagnolo).

SUMMARY

One aspect of the present disclosure is to provide a bicycle operating device that prevents engagement of an intermediate engaging portion located between first and second engaging portions during movement of a take-up member in a first direction but permits engagement of the intermediate engaging portion during movement of the take-up member in a second direction, which is opposite the first direction.

In view of the state of the known technology, a bicycle operating device is disclosed for operating a bicycle component, which basically comprises a fixed member, a winding member, a take-up member, a positioning ratchet and a preventing member. The winding member is movably arranged with respect to the fixed member. The take-up member is movably arranged with respect to the fixed member in a first direction and a second direction that is different from the first direction. The positioning member is movably arranged with respect to the fixed member such that the positioning member moves between a non-holding position and a holding position that prevents the take-up member from moving in the second direction. The positioning ratchet is fixedly coupled to the take-up member to move with the take-up member. The positioning ratchet includes a first engaging portion that is selectively engaged with the positioning member, a second engaging portion that is selectively engaged with the positioning member and an intermediate engaging portion that is selectively engaged with the positioning member, The intermediate engaging portion is arranged between the first engaging portion and the second engaging portion with respect to the first and second directions. The preventing member is movably arranged with respect to the positioning ratchet such that the preventing member prevents the positioning member from engaging the intermediate engaging portion of the positioning ratchet while the winding member moves the take-up member in the first direction.

Various objects, features, aspects and advantages of the bicycle operating device of the present disclosure will become apparent to those skilled in the art from the following detailed description, which, taken in conjunction with the annexed drawings, discloses one embodiment of a bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
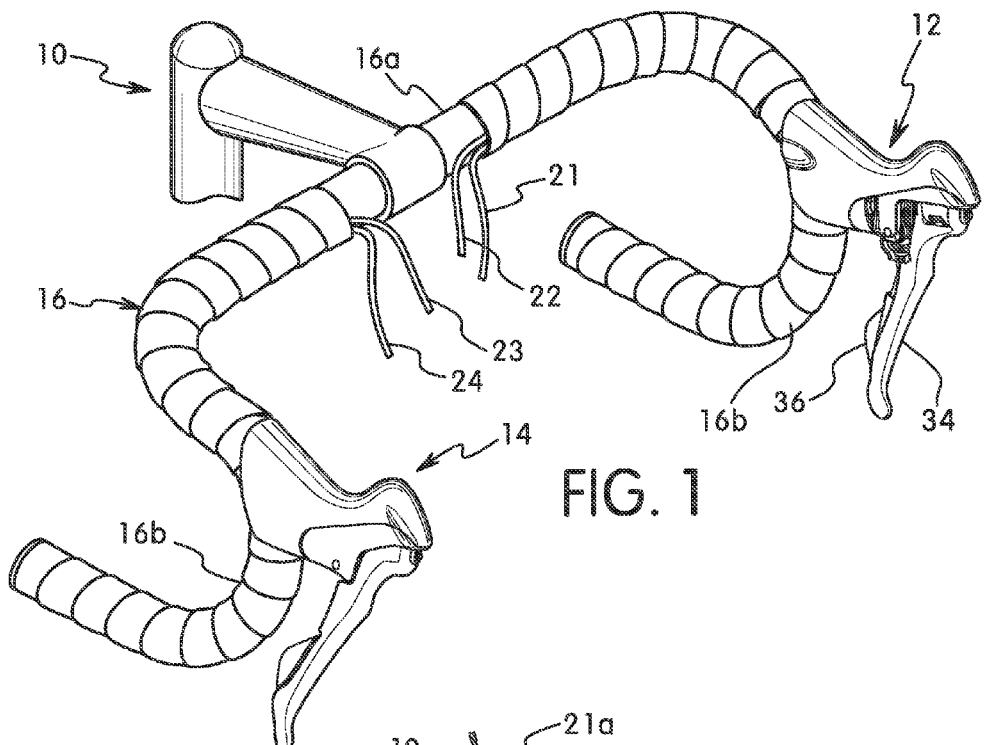
FIG. 1 is a front perspective view of a portion of a bicycle equipped with a bicycle operating device coupled to a drop type handlebar in its installed position in accordance with one illustrative embodiment.
Figure 2:
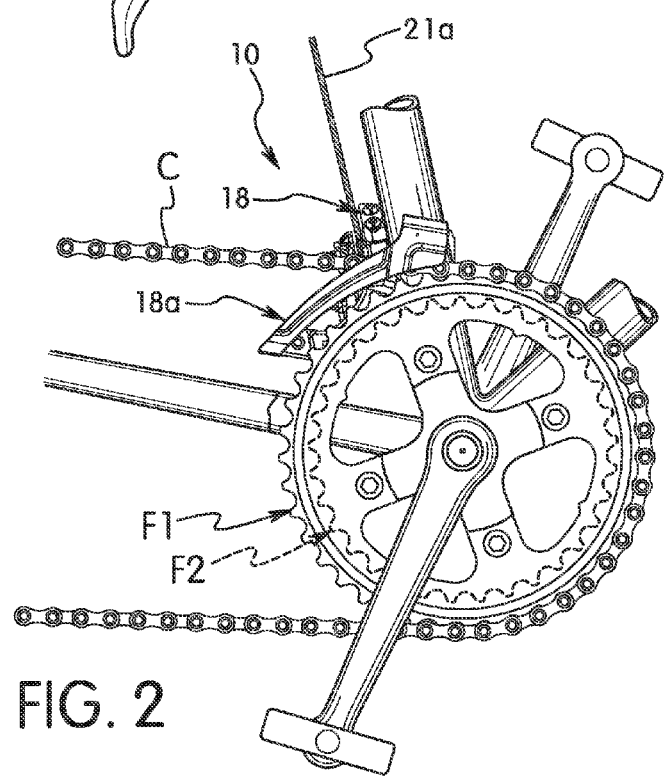
FIG. 2 is a side elevational view of a portion of a bicycle drive train that is operated by the bicycle operating devices illustrated in FIG. 1.

Referring initially to FIGS. 1 and 2, a bicycle driving system of a bicycle 10 that is equipped with a pair of bicycle operating devices 12 and 14 is illustrated. The bicycle operating devices 12 and 14 are mounted on a drop down handlebar 16 in accordance with the illustrated embodiments as seen in FIG. 1. The bicycle operating device 12 is a left hand side control device operated by the rider's left hand to operate a first brake device (not shown) and a first gear shifting device 18 (e.g., a cable operated front derailleur) as shown in FIG. 2. The bicycle operating device 14 is a right hand side control device operated by the rider's right hand to operate a second brake device (not shown) and a second gear shifting device (not shown—e.g., a cable operated rear derailleur). In the illustrated embodiment, the bicycle operating device 12 is operatively coupled to the first gear shifting device 18 via a shift control cable 21 and the first brake device (not shown) via a brake control cable 22. The bicycle operating device 14 is operatively coupled to the second gear changing device (not shown) via a shift control cable 23 and the second brake device (not shown) via a brake control cable 24. The first gear shifting device 18 is a part of the bicycle driving system that is used to shift a bicycle chain C for changing speeds of the drive train in a relatively conventional manner.

Figure 3:
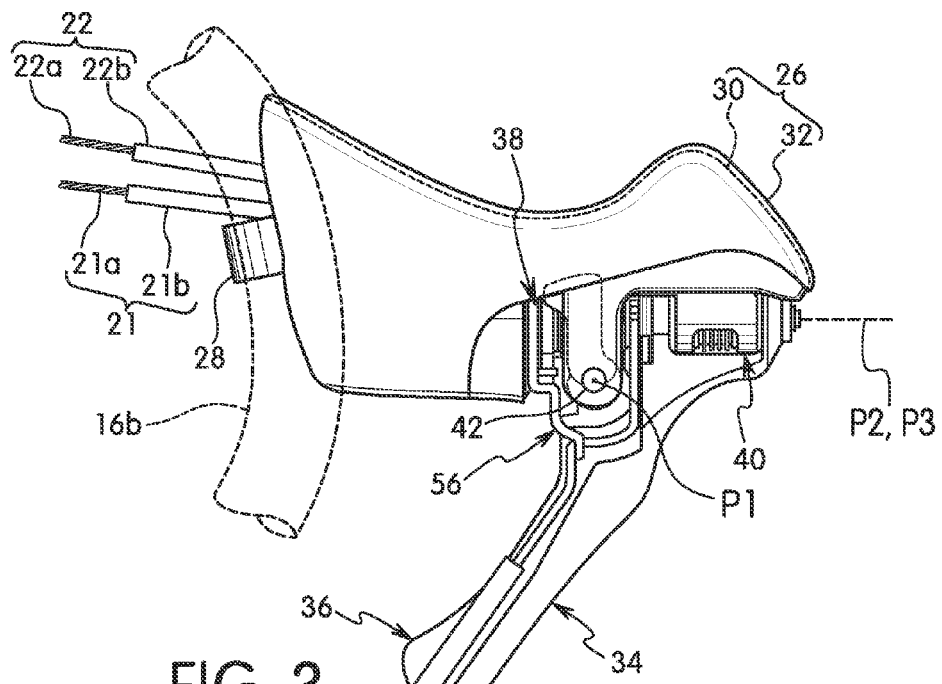
FIG. 3 is an inside elevational view of the bicycle operating device illustrated in FIG. 1 with the brake/shift lever and the shift (release) lever in their rest positions.
Figure 4:
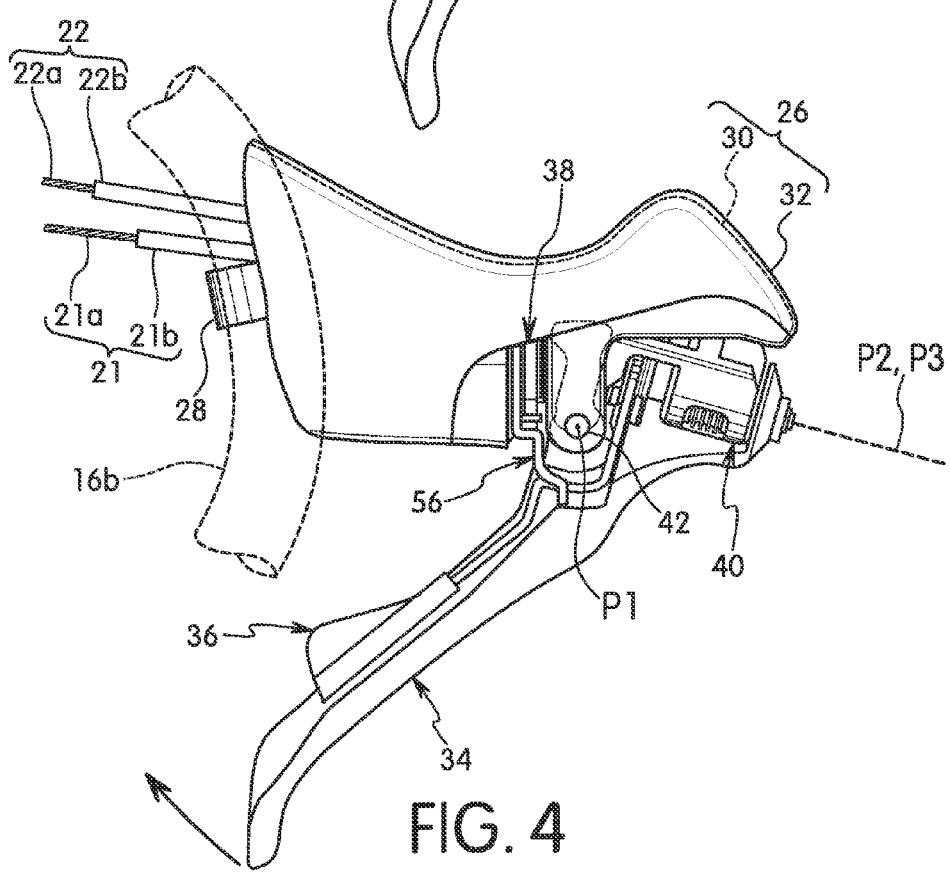
FIG. 4 is an inside elevational view of the bicycle operating device illustrated in FIG. 3 with the brake/shift lever pivoted to a braking position.

Preferably, the control cables 21 to 24 are conventional bicycle operating cables that have an outer case covering an inner wire. In other words, each of the control cables 21 to 24 are Bowden type cables basically include an inner wire slidably received within an outer case. For example, as seen in FIGS. 3 and 4, the shift control cable 21 has an inner wire 21a with an outer case 21b covering the inner wire 21a, while the brake control cable 22 has an inner wire 22a with an outer case 22b covering the inner wire 22a. The inner wire 21a constitutes a connecting member that operatively connects the bicycle operating device 12 to the first gear shifting device 18 for shifting the first gear shifting device 18 in response to operation of the bicycle operating device 12.

As seen in FIG. 1, normally, the gripping portions of the drop down handlebar 16 and portions of the control cables 21 and 22 are covered by the bar tape. The drop down handlebar 16 typically includes a straight cross portion 16a and a pair of downwardly curved portions 16b. The straight cross portion 16a connects upper ends of the downwardly curved portions 16b. The bicycle operating devices 12 and 14 are mounted to the downwardly curved portions 16b of the drop down handlebar 16. In the illustrated embodiment, the bicycle operating device 12 is mounted on the left hand side of the drop down handlebar 16 for operating the first gear shifting device 18 (e.g., a cable operated front derailleur) and the bicycle operating device 14 is mounted on the right hand side of the drop down handlebar 16 for operating the second gear shifting device (not shown). However, each of the bicycle operating devices 12 and 14 can be manufactured as a mirror of the illustrated embodiment, such that the bicycle operating devices 12 and 14 can be mounted on opposite sides of the drop down handlebar 16.

As seen in FIGS. 2 to 4, the bicycle operating device 12 includes a bracket or base member 26 that is fixedly mounted to one of the curved portions 16b of the drop down handlebar 16 by a handlebar mounting structure 28. Since the bracket 26 is fixed to the drop down handlebar 16 by the handlebar mounting structure 28, the bracket 26 constitutes a part of a fixed member of the bicycle operating device 12. Riders sometimes grip the bracket 26 and lean on the bracket 26 during riding. The bracket 26 has a rigid main body 30 and a soft outer elastomeric grip cover 32. The grip cover 32 partially covers the main body 30 as seen in FIGS. 3 and 4. In particular, the grip cover 32 is stretched over a gripping portion of the main body 30. Typically, the main body 30 is made of a rigid plastic material. The bracket 26 is a stationary member when mounted to the handlebar 16. The handlebar mounting structure 28 is preferably a conventional band clamp or similar structure that is used in a road shifter for mounting to a drop down style handlebar such as the drop down handlebar 16. Thus, the handlebar mounting structure 28 will not be discussed in detail herein.

In this embodiment, as best seen in FIG. 4, the bicycle operating device 12 further includes a brake/shift lever 34, a shift lever 36 and a shift operating unit 38. The main body 30 of the bracket 26 houses the shift operating unit 38 in an interior cavity of the main body 30. The brake/shift lever 34 and the shift lever 36 are examples of user operated levers used for operating the shift operating unit 38 as discussed below. The brake/shift lever 34 and the shift lever 36 are movable with respect to the bracket 26 to operate the shift operating unit 38.

The brake/shift lever 34 is used to perform both a braking operation and a shifting operation, while the shift lever 36 only performs a shifting operation. The brake/shift lever 34 and the shift lever 36 are operatively coupled to the shift operating unit 38 for performing shifting operations in a gear shifting device to change gears (i.e., shifting a chain between the gears). The brake/shift lever 34 and the shift lever 36 are preferably both pivoted relative to the main body 30 of the bracket 26 in a direction towards a bicycle longitudinal center plane for performing shifting operations.

Referring to FIGS. 3 and 4, the brake/shift lever 34 functions as a brake lever. The brake/shift lever 34 pulls the inner wire 22a of the brake cable 22 by pivoting the brake/shift lever 34 about a brake pivot axis P1 relative to the main body 30 of the bracket 26 towards the curved portion 16b of the handlebar 16 as seen in FIG. 4. Once the brake/shift lever 34 is release, the brake/shift lever 34 automatically returns to its rest position. The term "rest position" as used herein refers to a state in which the brake/shift lever 34 remains stationary without the need of a user or other external force outside of the bicycle operating device 12 to hold the part in that state corresponding to the rest position. The rest position of the brake/shift lever 34 also corresponds to a non-braking position and a non-shifting position. The brake/shift lever 34 also functions as a cable pulling (winding) lever as discussed below. In the illustrated embodiment, the shift lever 36 also moves with the brake/shift lever 34 as the brake/shift lever 34 is moved from its rest position (FIG. 3) to its braking position (FIG. 4). When the brake/shift lever 34 is pivoted from its rest position (FIG. 3) to its braking position (FIG. 4) solely about the brake pivot axis P1, only a braking operation is performed (i.e., no shifting is occurring by either the brake/shift lever 34 or the shift lever 36).

Figure 5:
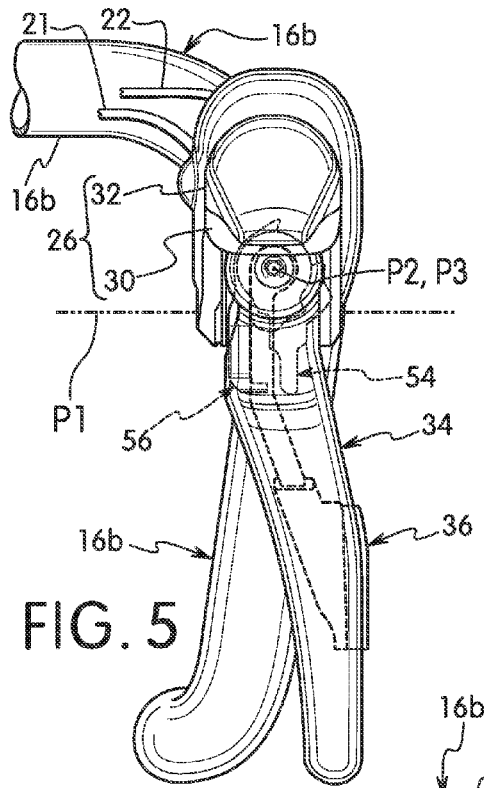
FIG. 5 is a front elevational view of the portion of the drop type handlebar and the bicycle operating device illustrated in FIGS. 1 to 4 with the brake/shift lever and the shift (release) lever in their rest positions.
Figure 6:
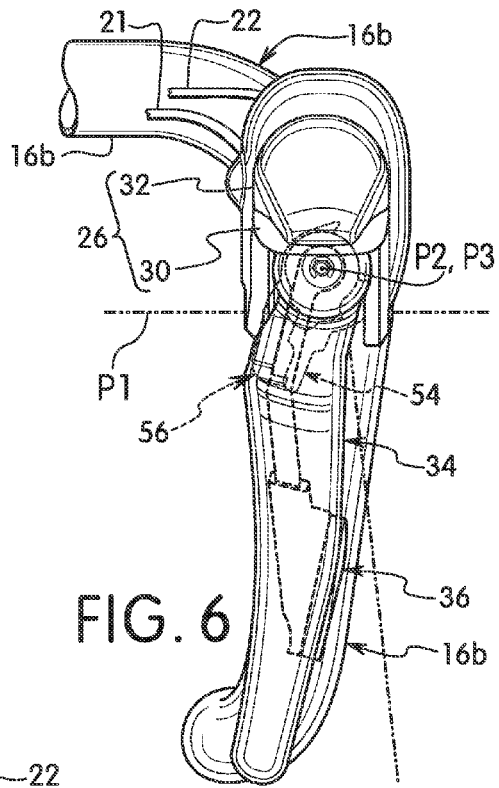
FIG. 6 is a front elevational view of the portion of the drop type handlebar and the bicycle operating device illustrated in FIG. 5 with the brake/shift lever moved to a first cable pulling position.
Figure 7:
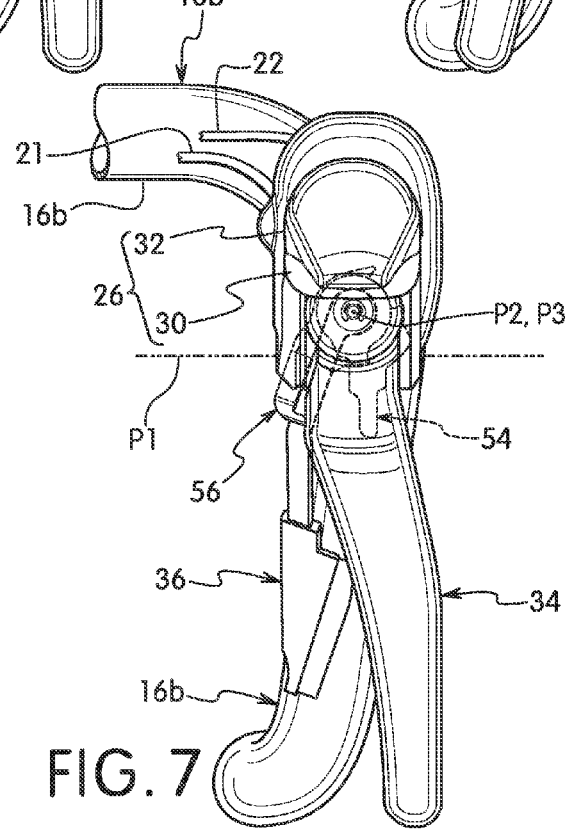
FIG. 7 is a front elevational view of the portion of the drop type handlebar and the bicycle operating device illustrated in FIGS. 5 and 6 with the shift (release) lever of the bicycle operating device moved to a cable releasing position.

Referring to FIGS. 5 to 7, shifting operations of the brake/shift lever 34 and the shift lever 36 are illustrated. The brake/shift lever 34 and the shift lever 36 are shown in their rest positions in FIG. 5. The brake/shift lever 34 and the shift lever 36 are preferably both pivoted relative to the main body 30 of the bracket 26 in a direction towards a bicycle longitudinal center plane for performing shifting operations. Specifically, the brake/shift lever 34 pivots from its rest position (FIG. 5) to a shifting position (FIG. 6) about a shift pivot axis P2 relative to the bracket 26 towards the center longitudinal plane of the bicycle 10 for performing shifting operation. The shift lever 36 pivots from its rest position (FIG. 5) to a shifting position (FIG. 7) about a shift pivot axis P3 relative to the bracket 26 towards the center longitudinal plane of the bicycle 10 for performing shifting operation. Here in illustrated embodiment, the shift pivot axes P2 and P3 are concentric pivot axes. The brake/shift lever 34 and the shift lever 36 are trigger type levers that are biased to the rest positions in a conventional manner. The term "rest position" as used herein with respect to the brake/shift lever 34 and the shift lever 36 refers to a state in which the part (e.g., the brake/shift lever 34 and the shift lever 36) remains stationary without the need of a user or other external force outside of the bicycle operating device 12 to hold the part in that state corresponding to the rest position.

The brake/shift lever 34 pulls the inner wire 21a of the shift cable 21 into the shift operating unit 38 by pivoting the brake/shift lever 34 about the shift pivot axis P2 relative to the bracket 26 towards the center longitudinal plane of the bicycle 10 as seen in FIG. 6. In the illustrated embodiment, the shift lever 36 also moves with the brake/shift lever 34 as the brake/shift lever 34 is moved from its rest position (FIG. 5) to its shifting position (FIG. 6). When the brake/shift lever 34 is pivoted from its rest position (FIG. 5) to its shifting position (FIG. 6), the shift lever 36 is effectively inoperative. The brake/shift lever 34 is operatively coupled to the shift operating unit 38 such that one shift or multiple shifts can be made depending on an operation stroke length of the brake/shift lever 34.

The shift lever 36 functions as a cable releasing lever. The shift lever 36 releases the inner wire 21a from the shift operating unit 38 by pivoting the shift lever 36 about the shift pivot axis P3 relative to the bracket 26 towards the center longitudinal plane of the bicycle 10. In the illustrated embodiment, the brake/shift lever 34 remains stationary during movement of the shift lever 36 to perform cable releasing operations as discussed below.

Figure 8:
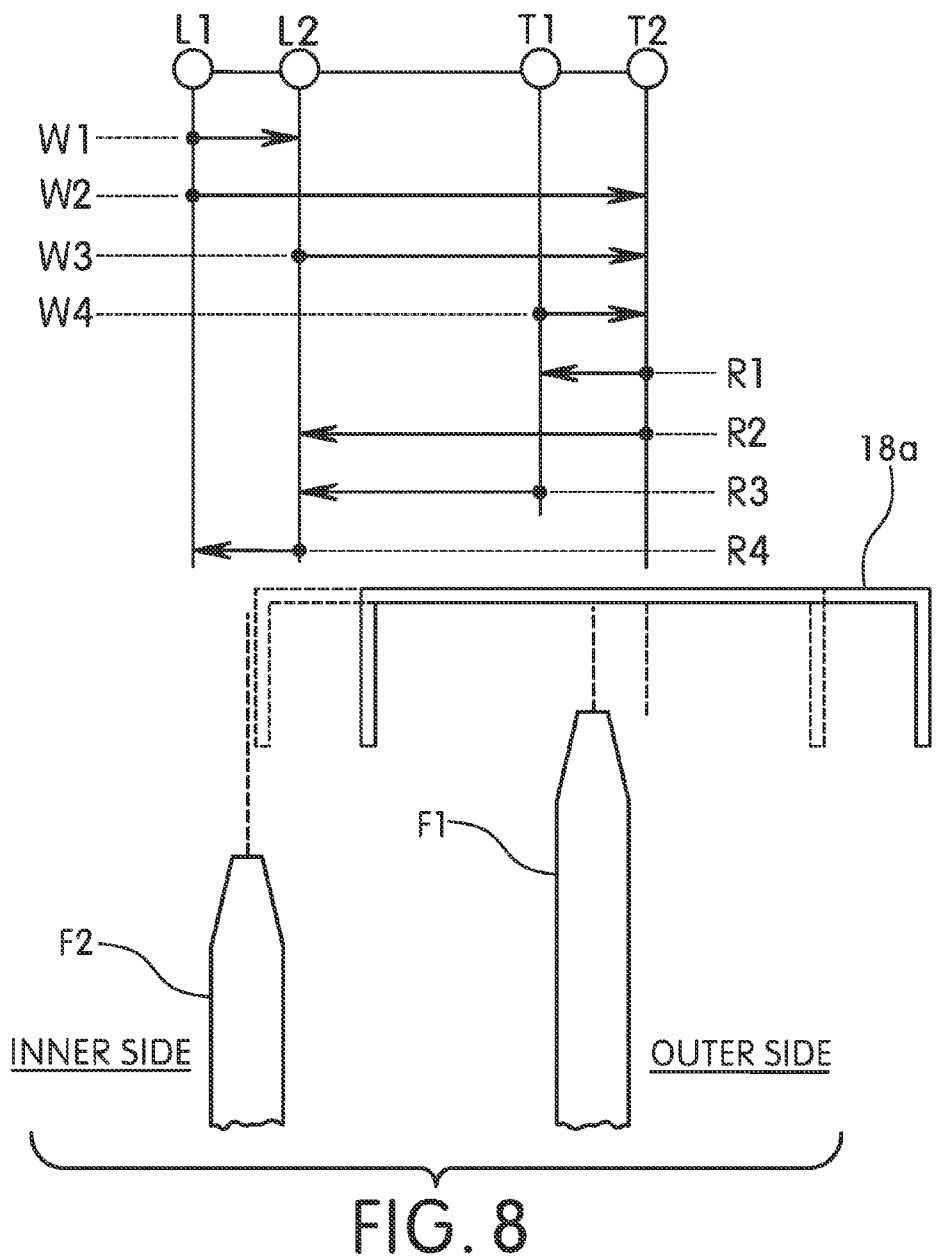
FIG. 8 is a schematic diagram illustrating various guiding positions for the chain guide of the front derailleur resulting by operating the brake/shift lever and the shift (release) lever of the bicycle operating device.

Referring to FIGS. 2 and 8, in the illustrated embodiment, the bicycle operating device 12 is used to operate the first gear shifting device 18 (e.g., a cable operated front derailleur) to shift the chain between a first or outer gear F1 and a second or inner gear F2. Thus, as explained below, the shift operating unit 38 has four distinct and separate cable holding positions for holding the first gear shifting device 18 in four distinct and separate chain guiding positions as diagrammatically illustrated in FIG. 8. As seen in FIG. 2, the first or outer gear F1 is the largest front sprocket, and has a first diameter. The second or inner gear F2 is the smallest front sprocket, and has a second diameter that is smaller than the first diameter of the first or outer gear F1. The gears F1 and F2 form a gear assembly or crankset of the bicycle driving system.

As explained below, the shift operating unit 38 selectively holds a chain guide 18a (i.e., a guiding portion) of the first gear shifting device 18 in the four chain guiding positions. FIG. 8 schematically illustrates these four chain guiding positions of the chain guide 18a of the gear shifting device 18 as a result of operation of the bicycle operating device 12. Basically, with the bicycle operating device 12, the chain guide 18a can be moved between the following four different chain guiding positions: a first low chain guiding position L1, a second low chain guiding position L2, a first top chain guiding position T1 and a second top chain guiding position T2. These four chain guiding positions L1, L2, T1 and T2 correspond to a longitudinal center of the chain guide 18a that is halfway between the chain contact surfaces of the chain guide 18a. As seen in FIG. 8, the outer and inner gears F1 and F2 are axially spaced apart by a predetermined spacing or distance.

The first and second low chain guiding positions L1 and L2 are both used for maintaining the chain guide 18a of the gear shifting device 18 over the inner gear F2. The first low chain guiding position L1 corresponds to an innermost chain guiding position of the chain guide 18a of the gear shifting device 18. The first and second top chain guiding positions T1 and T2 are both used for maintaining the chain guide 18a of the gear shifting device 18 over the outer gear F1. The second top chain guiding position T2 corresponds to an outermost chain guiding position of the chain guide 18a of the gear shifting device 18. The second low chain guiding position L2 and the first top chain guiding position T1 correspond to intermediate chain guiding positions, respectively. The first top chain guiding position T1 corresponds a top trim position. With the chain guide 18a in the first top chain guiding position T1, the outer gear F1 is offset from the center of the chain guide 18a such that the outer gear F1 is closer to an outside plate of the chain guide 18a than when the chain guide 18a is in the second top chain guiding position T2. The second low chain guiding position L2 corresponds to a low trim position. With the chain guide 18a in the second low chain guiding position L2, the inner gear F2 is offset from the center of the chain guide 18a such that the inner gear F2 is closer to an inside plate of the chain guide 18a than when the chain guide 18a is in the first low chain guiding position L1.

The top and low trim positions are micro adjustments that are used to prevent the chain C from rubbing on the inside of the chain guide 18a when the chain C is engaged with the top gear of one of the front or rear gears and the low gear of the other of the front or rear gears. Thus, trimming means operating the bicycle operating device 12 to move the chain guide 18a laterally just a little bit, enough to stop the chain C from rubbing on the inside of the chain guide 18a, but not enough to shift the chain C to a different chainring or gear. As a result, when the rider shifts between the first and second top chain guiding positions T1 and T2, the chain C is not shifted to the inner gear F2 from the outer gear F1. Rather, when the rider shifts between the first and second top chain guiding positions T1 and T2, the chain C remains on the outer gear F1. Similarly, when the rider shifts between the first and second low chain guiding positions L1 and L2, the chain C is not shifted to the outer gear F1 from the inner gear F2. Rather, when the rider shifts between the first and second low chain guiding positions L1 and L2, the chain C remains on the inner gear F2.

Using the brake/shift lever 34 of the bicycle operating device 12 to operate the shift operating unit 38 to perform a pulling operation, the rider can selectively shift the chain guide 18a directly from the first low chain guiding position L1 to either the second low chain guiding position L2 or the second top chain guiding position T2 in a single progressive movement of the brake/shift lever 34. However, as discussed below, the shift operating unit 38 is configured such that the shift operating unit 38 cannot be shifted directly from the first low chain guiding position L1 or the second low chain guiding position L2 to the first top chain guiding position T1 in a single progressive movement of the brake/shift lever 34. The brake/shift lever 34 can be pivoted along the shifting path in a single progressive movement by a first pulling amount W1 to shift from directly from the first low chain guiding position L1 to the second low chain guiding position L2 as diagrammatically illustrated in FIG. 8. On the other hand, the brake/shift lever 34 can be pivoted along the shifting path in a single progressive movement by a second pulling amount W2 to shift from directly from the first low chain guiding position L1 to the second top chain guiding position T2 as diagrammatically illustrated in FIG. 8.

Also, using the brake/shift lever 34 of the bicycle operating device 12 to operate the shift operating unit 38 to perform a pulling operation, the rider can shift the chain guide 18a directly from the second low chain guiding position L2 to the second top chain guiding position T2 in a single progressive movement of the brake/shift lever 34. In particular, the brake/shift lever 34 can be pivoted along the shifting path in a single progressive movement by a third pulling amount W3 to shift from directly from the second low chain guiding position L2 to the second top chain guiding position T2 as diagrammatically illustrated in FIG. 8. However, the shift operating unit 38 is configured such that the shift operating unit 38 cannot be shifted directly from the second low chain guiding position L2 to the first top chain guiding position T1 in a single progressive movement of the brake/shift lever 34.

Moreover, using the brake/shift lever 34 of the bicycle operating device 12 to operate the shift operating unit 38 to perform a pulling operation, the rider can also shift the chain guide 18a directly from the first top chain guiding position T1 to the second top chain guiding position T2 in a single progressive movement of the brake/shift lever 34. In particular, the brake/shift lever 34 can be pivoted along the shifting path in a single progressive movement by a fourth pulling amount W4 to shift from directly from the first top chain guiding position T1 to the second top chain guiding position T2 as diagrammatically illustrated in FIG. 8.

On the other hand, as diagrammatically illustrated in FIG. 8, using the shift lever 36 of the bicycle operating device 12 to operate the shift operating unit 38 to perform a releasing operation, the rider can shift the chain guide 18a directly from any one of the four chain guiding positions L1, L2, T1 and T2 to the immediately adjacent position in a single progressive movement as diagrammatically illustrated in FIG. 8. For example, the shift lever 36 can be pivoted along the shifting path in a single progressive movement by a first releasing amount R1 to shift from directly from the second top chain guiding position T2 to the first top chain guiding position T1. Alternatively, using the shift lever 36 of the bicycle operating device 12 to operate the shift operating unit 38 to perform a releasing operation, the rider can also shift the chain guide 18a directly from the second top chain guiding position T2 to the second low chain guiding position L2. In particular, the shift lever 36 can be pivoted along the shifting path in a single progressive movement by a second releasing amount R2 to shift directly from the second top chain guiding position T2 to the second low chain guiding position L2. The shift lever 36 can further be pivoted along the shifting path in a single progressive movement by a third releasing amount R3 to shift from directly from the first top chain guiding position T1 to the second low chain guiding position L2. Finally, the shill, lever 36 can be pivoted along the shifting path in a single progressive movement by a fourth releasing amount R4 to shift directly from the second low chain guiding position L2 to the first low chain guiding position L1.

Accordingly, as diagrammatically illustrated in FIG. 8, during cable pulling operations, the bicycle operating device 12 is configured such that the rider cannot shift the chain guide 18a directly to the first top chain guiding position T1 (e.g., the trim position) from either of the first and second low chain guiding positions L1 and L2 in a single progressive movement. In other words, during a cable pulling operation from either of the first and second low chain guiding positions L1 and L2, the first top chain guiding position T1 is bypassed (skipped) by operating the brake/shift lever 34 in a single progressive movement. However, during a cable releasing operation, the rider can shift directly to the first top chain guiding position T1 from the second top chain guiding position T2.

Referring to FIGS. 3, 4 and 9 to 11, the connection of the brake/shift lever 34 and the shift lever 36 will now be discussed in more detail. As seen in FIGS. 3 and 4, the brake/shift lever 34 and the shift lever 36 are supported on the main body 30 of the bracket 26 by a support member 40. Thus, the brake/shift lever 34 and the shift lever 36 are separable as an integrated unit from the main body 30 and the shift operating unit 38. In particular, the support member 40 is solely attached to the main body 30 of the bracket 26 by a pivot pin 42. The pivot pin 42 defines the brake pivot axis P1 such that the brake/shift lever 34, the shift lever 36 and the support member 40 pivot together as a unit on the pivot pin 42 during a braking operation.

Figure 10:
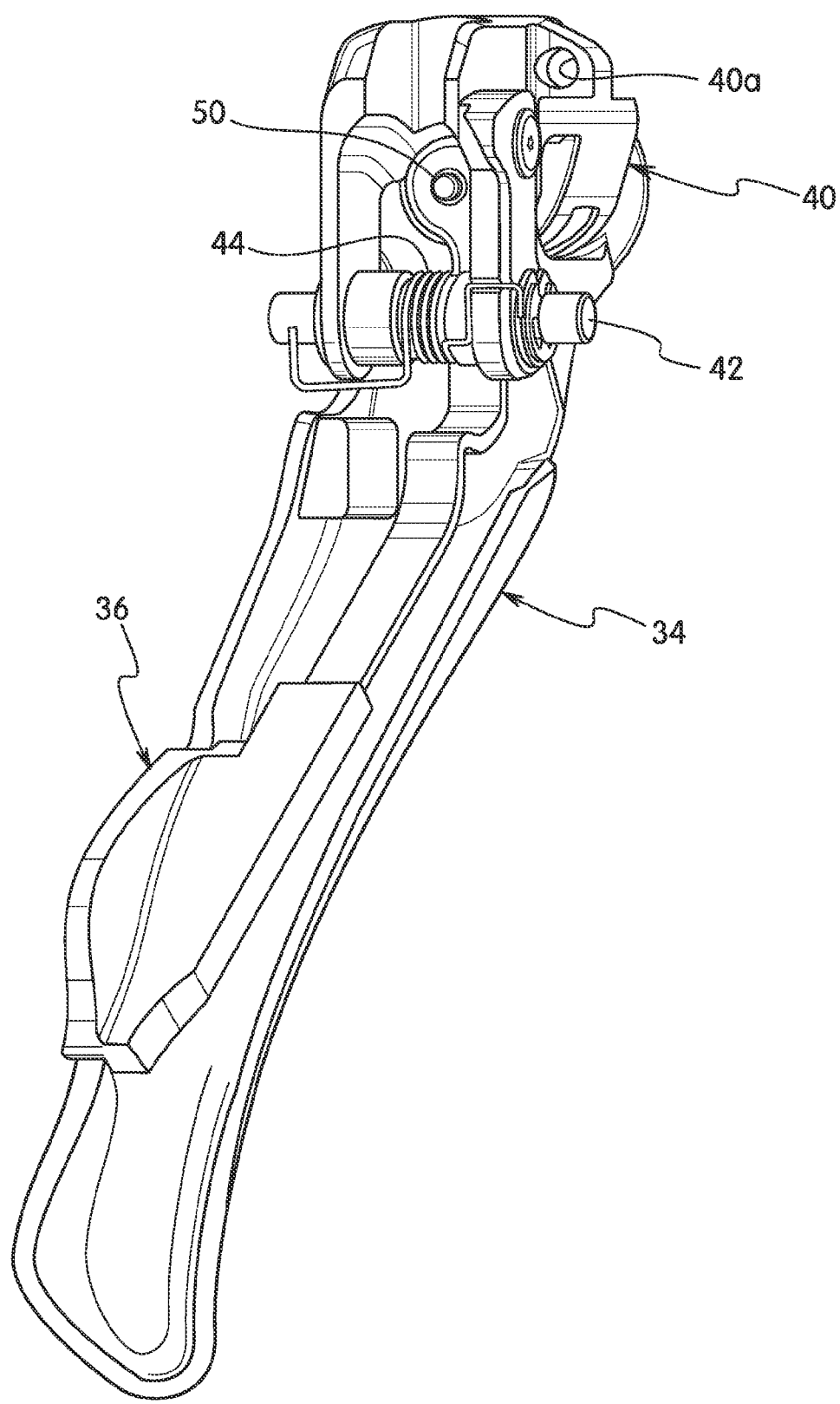
FIG. 10 is a rear side perspective view of the brake/shift lever and the shift (release) lever of the bicycle operating device.
Figure 11:
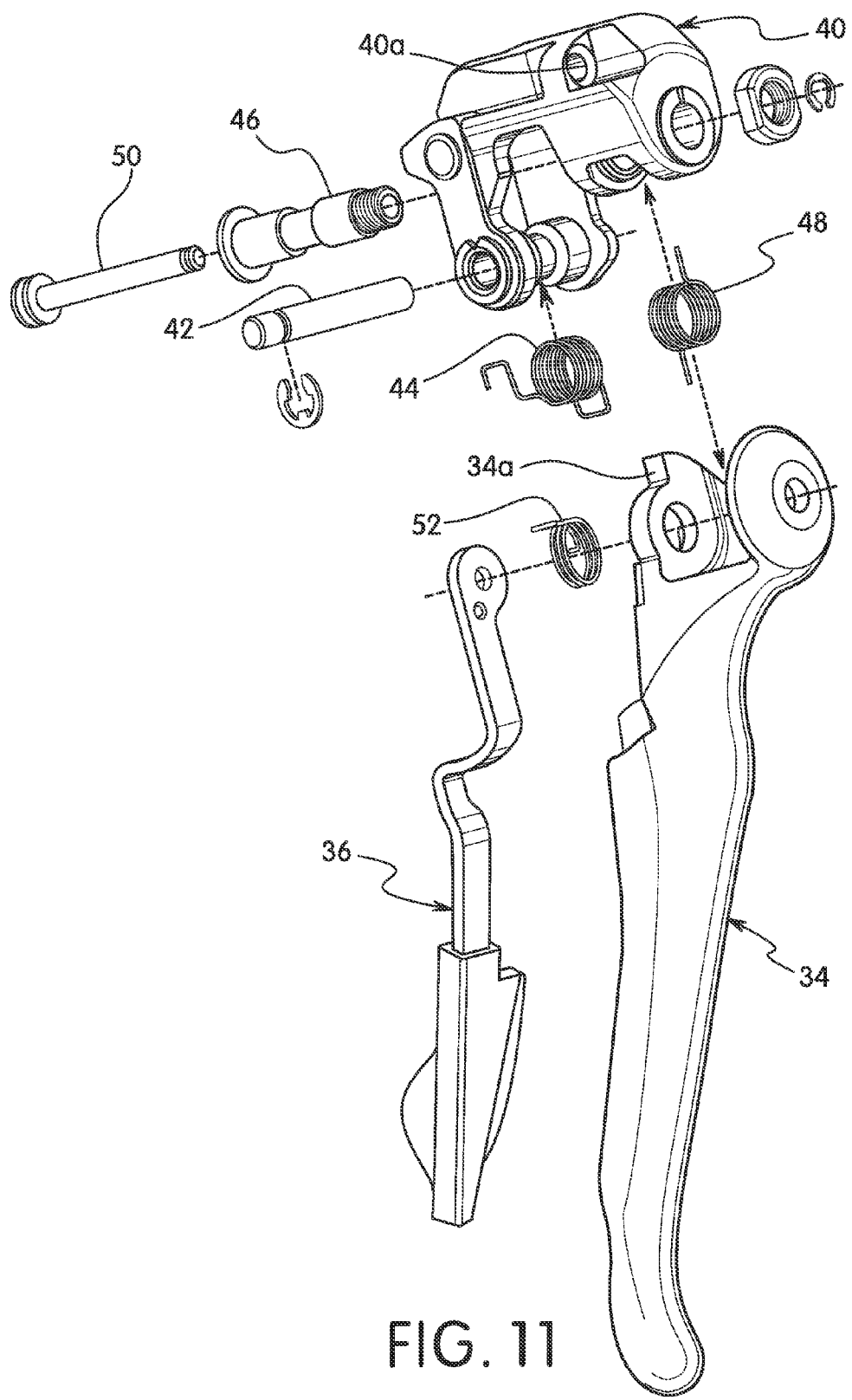
FIG. 11 is an exploded front side perspective view of the brake/shift lever and the shift (release) lever of the bicycle operating device.

As seen in FIGS. 10 and 11, a biasing element 44 is provided on the pivot pin 42 to apply a biasing force between the main body 30 and the support member 40. The biasing element 44 is arranged on the pivot pin 42 for biasing the support member 40 and the brake/shift lever 34 to the non-braking position (i.e., a rest position) relative to the main body 30 as seen in FIG. 3. In the illustrated embodiment, the biasing element 44 is a torsion spring with its coiled portion disposed on the pivot pin 42. A first free end of the biasing element 44 contacts a portion of the main body 30 that is behind the pivot pin 42, while a second free end of the biasing element 44 contacts the support member 40.

As best seen in FIGS. 10 and 11, the support member 40 also includes a brake cable attachment structure 40a (e.g., a bore) for attaching the inner wire 22a. When the brake/shift lever 34 is pivoted about the brake pivot axis P1, the brake/shift lever 34 pulls the inner wire 22a relative to the outer case 22b to perform a braking operation. Generally speaking, in performing braking operations, the brake/shift lever 34 moves in a longitudinal direction with respect to the bracket 26. In other words, during a braking operation, the brake/shift lever 34 moves along a brake operating plane that is substantially perpendicular the shift operating planes of the brake/shift lever 34 and the shift lever 36. Thus, the brake/shift lever 34 moves with respect to the bracket 26 about the brake pivot axis P1 that is perpendicular to the shift pivot axes P2 and P3.

As best seen in FIGS. 5, 6 and 9 to 11, the brake/shift lever 34 is pivotally attached to the support member 40 by a pivot pin 46 that defines the shift pivot axis P2. In the illustrated embodiment, the pivot pin 46 is a tubular member. As best seen in FIGS. 10 and 11, a biasing element 48 is provided between the brake/shift lever 34 and the support member 40. The biasing element 48 is arranged for biasing the brake/shift lever 34 to a non-shifting position (i.e., a rest position as seen in FIG. 5) such that an abutment 34a contacts the support member 40. In the illustrated embodiment, the biasing element 48 is a torsion spring with its coiled portion disposed on the pivot pin 46. A first free end of the biasing element 48 is disposed in a hole of the brake/shift lever 34, while a second free end of the biasing element 48 is disposed in a hole of the support member 40.

Referring back to FIGS. 5 and 6, in performing a shifting (cable winding or pulling) operation with the brake/shift lever 34, the brake/shift lever 34 is moved (pivoted) laterally inward about the shift pivot axis P2 from the rest position (FIG. 5) to either a first cable pulling position (FIG. 6) to perform a single gear shift operation or farther a second cable pulling position to perform a two gear shift operation in a single progressive movement. In this illustrated embodiment, when the brake/shift lever 34 is moved to perform a shifting operation, the shift lever 36 also moves with the brake/shift lever 34.

Figure 9:
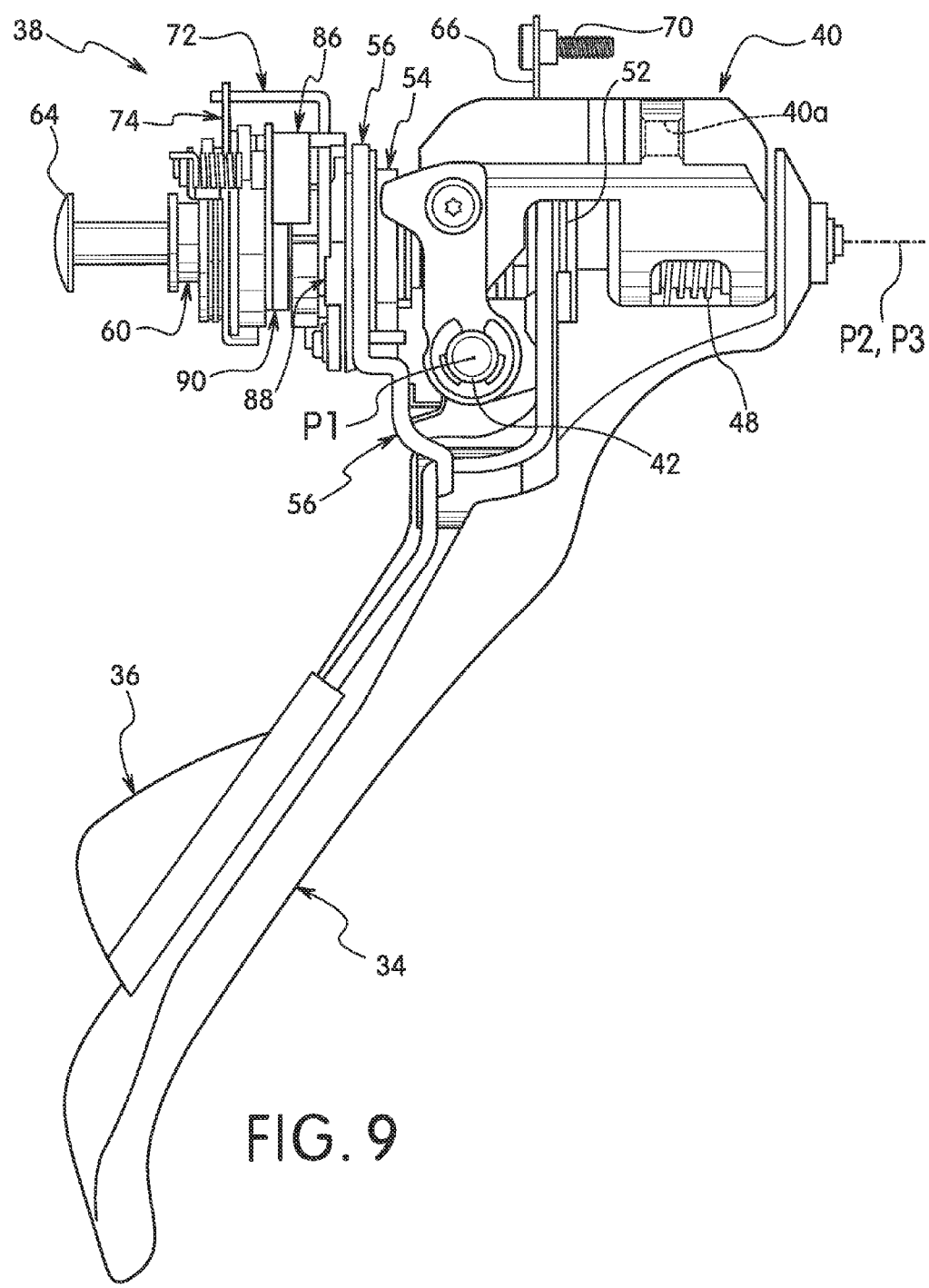
FIG. 9 is an inside elevational view of the shift operating unit of the bicycle operating device and the brake/shift lever and the shift (release) lever of the bicycle operating device in their rest positions.

Referring to FIGS. 9 to 11, the shift lever 36 is also pivotally mounted to the support member 40 by a pivot pin 50 about the shift pivot axis P3. In the illustrated embodiment, the pivot pin 50 is located within the pivot pin 46 such that the shift pivot axes P2 and P3 are concentric. Alternatively, the pivot pin 50 for the shift lever 36 can be mounted to the support member 40 such that the shift pivot axis P3 is either parallel to the shift pivot axis P2 or angled with respect to the shift pivot axis P2. A biasing element 52 is provided between the brake/shift lever 34 and the support member 40 for biasing the shift lever 36 to a rest position. In the illustrated embodiment, the biasing element 52 is a torsion spring with its coiled portion disposed on the pivot pin 50. A first free end of the biasing element 52 is disposed in a hole of the shift lever 36, while a second free end of the biasing element 52 is disposed in a hole of the brake/shift lever 34.

Referring back to FIGS. 5 and 7, in performing a shifting (releasing) operation with the shift lever 36, the shift lever 36 is moved laterally inward about the shift pivot axis P3 from the rest position (FIG. 5) to a cable releasing position (FIG. 7) to perform a gear shift operation. In this illustrated embodiment, when the shift lever 36 is moved to perform a shifting (releasing) operation, the brake/shift lever 34 does not move with the shift lever 36. Rather during performing a shifting operation with the shift lever 36, the brake/shift lever 34 remains in its rest position due to the biasing force of the biasing element 48.

Generally speaking, in performing shifting operations, the brake/shift lever 34 and the shift lever 36 both move in a lateral direction with respect to the bracket 26 along shift operating planes to operate the shift operating unit 38. While in this illustrated embodiment, the shift pivot axes P2 and P3 are coincident, the shift pivot axes P2 and P3 could be made to be offset if needed and/or desired. Moreover, the shift operating unit 38 can be operated in a variety of different ways, if needed and/or desired. For example, the shift operating unit 38 could be operated with buttons instead of by the brake/shift lever 34 and the shift lever 36.

Figure 12:
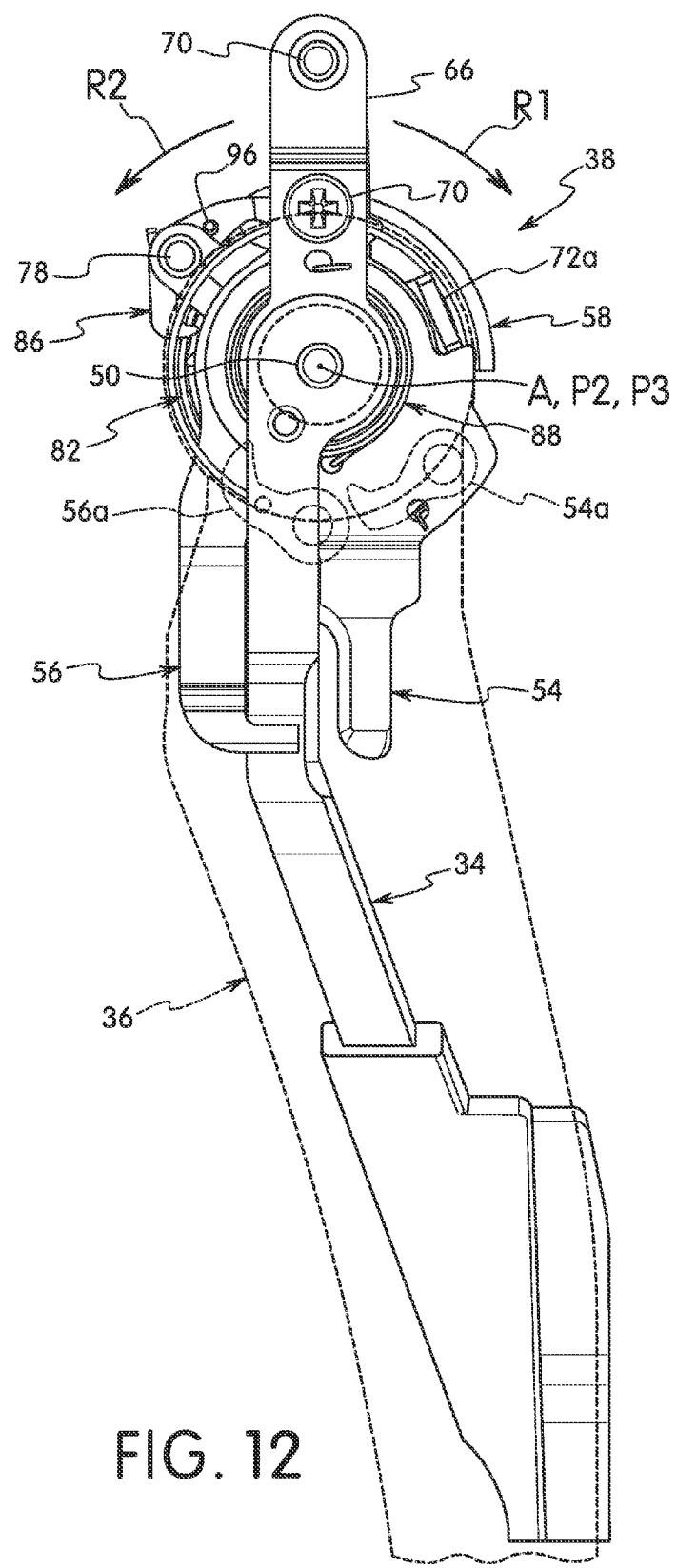
FIG. 12 is a front side elevational view of selected parts of the shift operating unit as viewed along the center axis of the main shift axle, with the control members in their rest positions and the shift operating unit being in a fully released position such that the front derailleur is held in the first low guiding position (the innermost position) with the chain on the inner gear.
Figure 13:
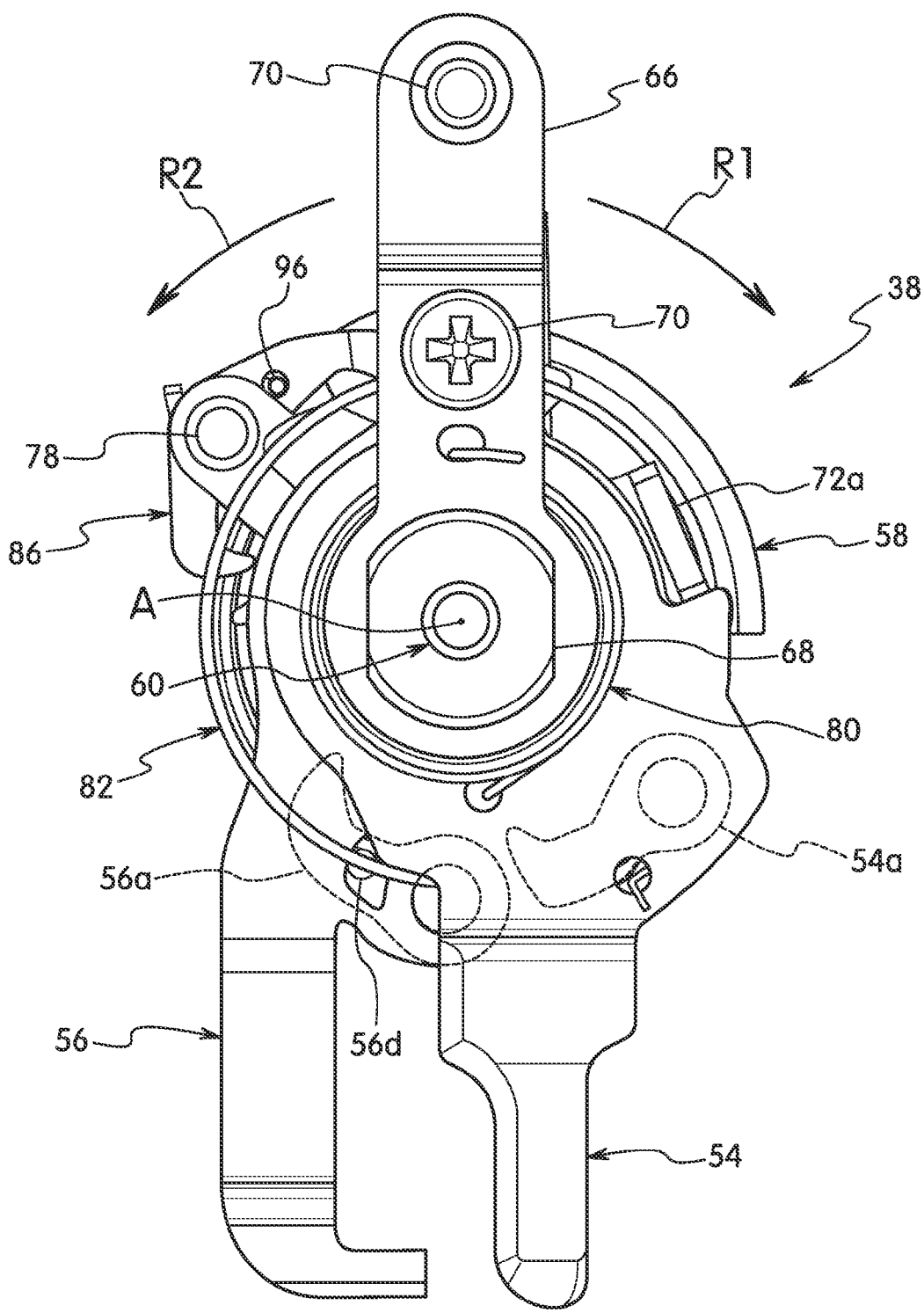
FIG. 13 is an enlarged front side elevational view of the selected parts of the shift operating unit illustrated in FIG. 12, but with the shift (release) lever of the bicycle operating device removed.
Figure 14:
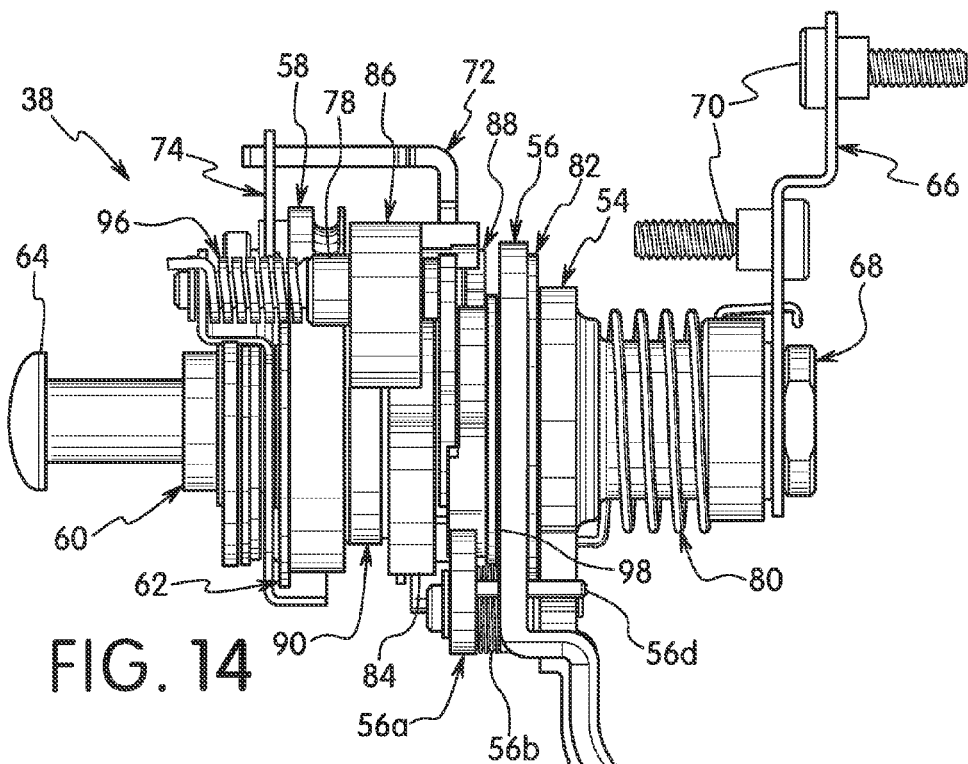
FIG. 14 is an enlarged inside elevational view of the shift operating unit illustrated in FIG. 13 with the control members in their rest positions.
Figure 15:
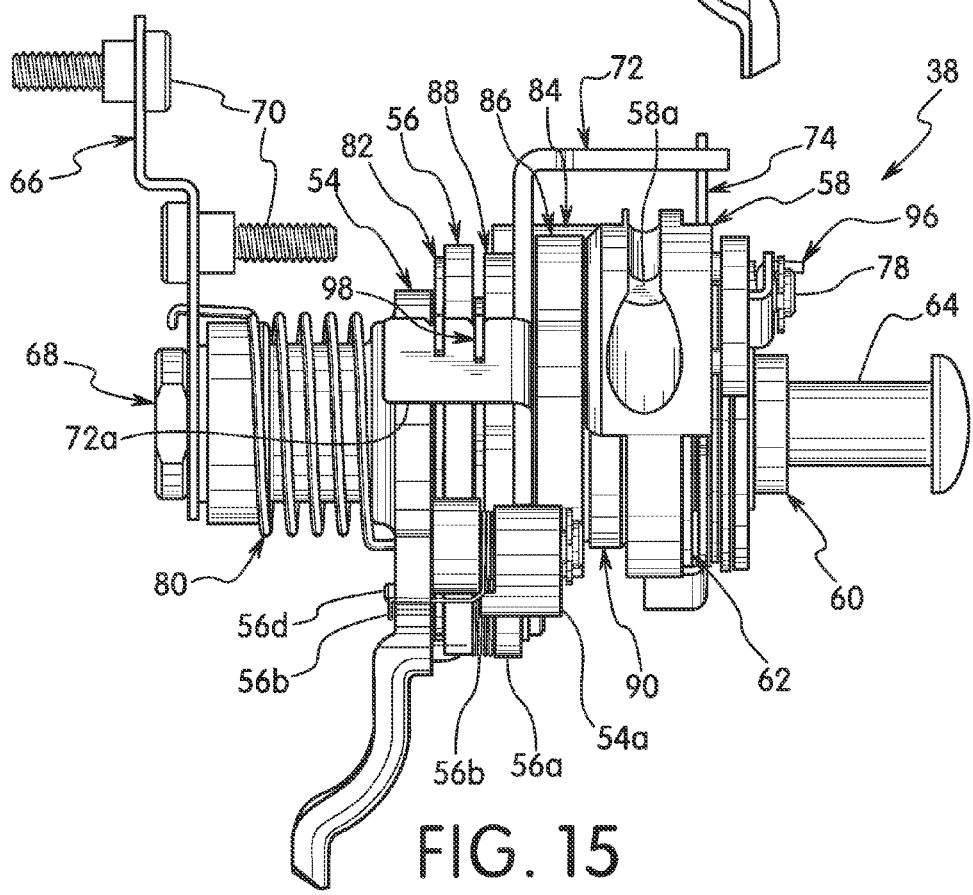
FIG. 15 is an enlarged outside elevational view of the shift operating unit illustrated in FIGS. 13 and 14 with the control members in their rest positions.
Figure 16:
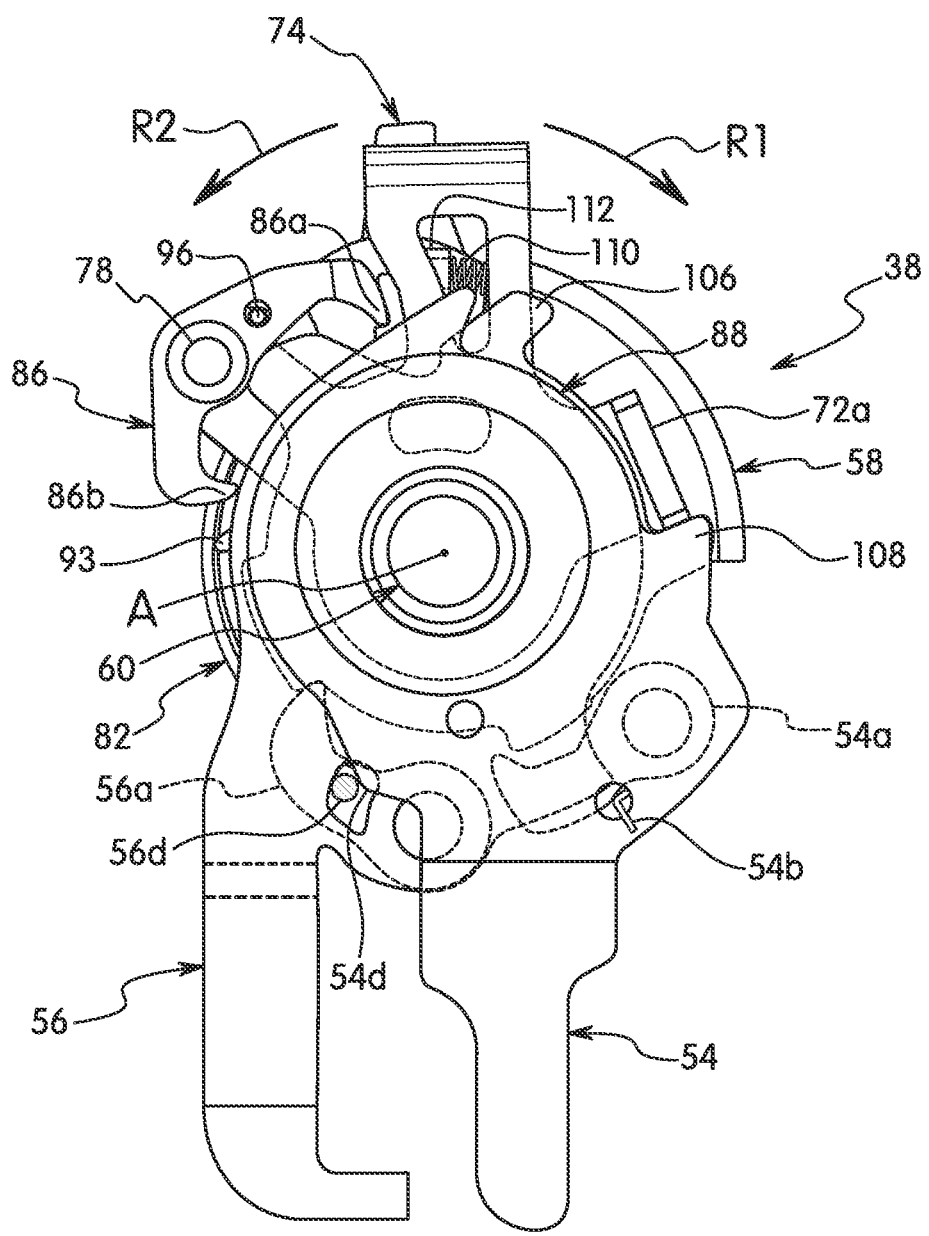
FIG. 16 is an enlarged front side elevational view of selected parts of the shift operating unit illustrated in FIGS. 13 to 15 with the control members in their rest positions.
Figure 17:
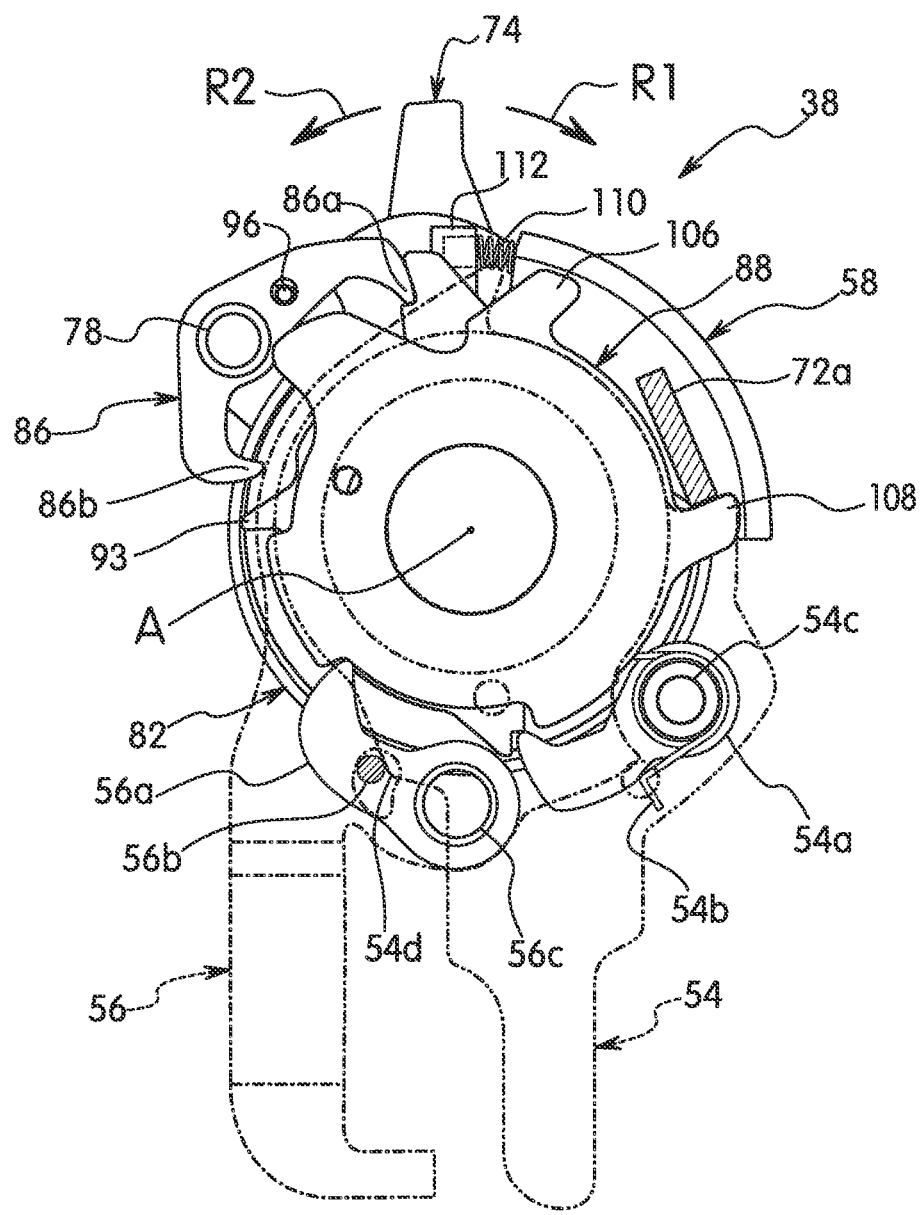
FIG. 17 is an enlarged front side elevational view of selected parts of the shift operating unit illustrated in FIGS. 13 to 16 with the control members in their rest positions.
Figure 18:
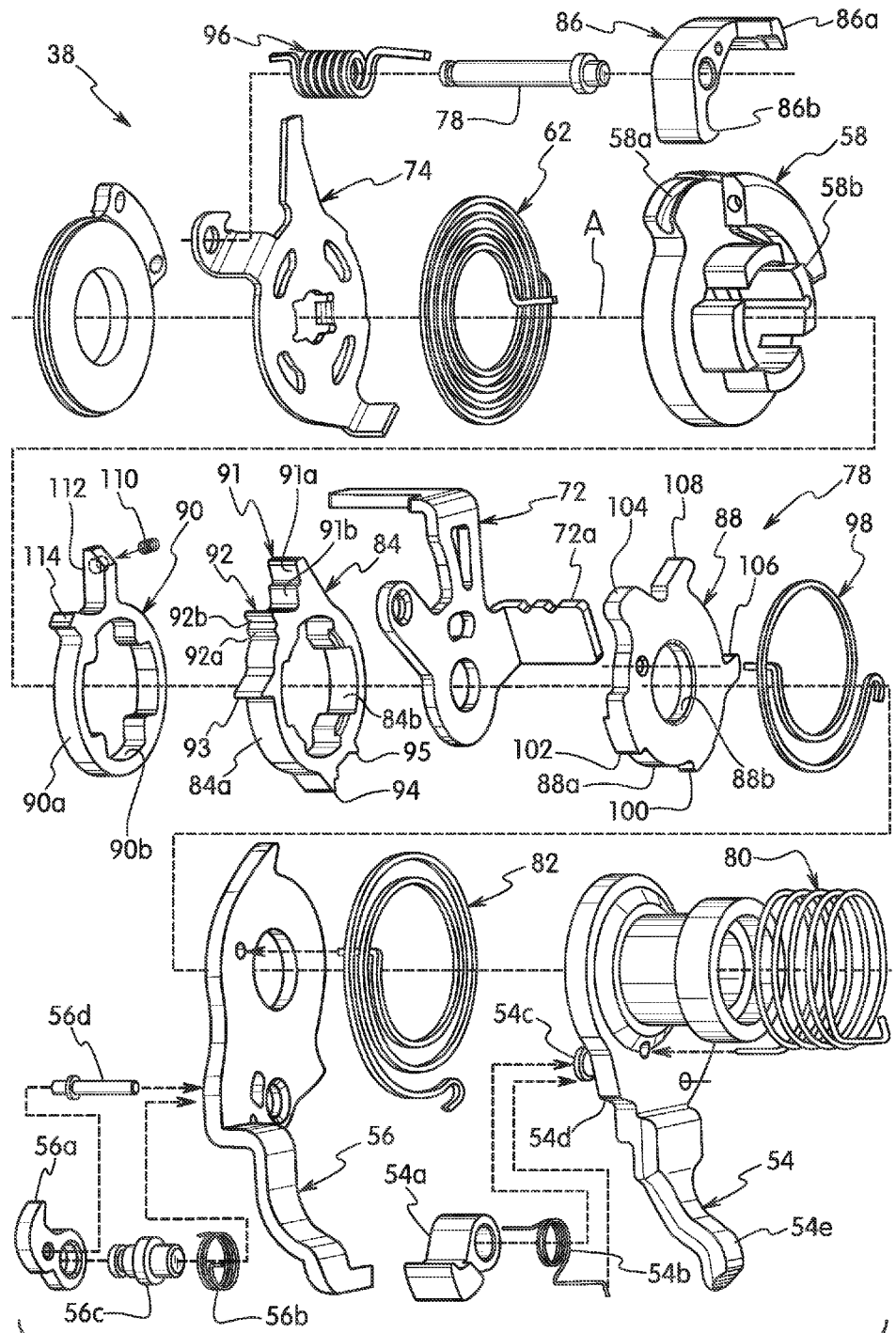
FIG. 18 is an exploded perspective view of selected parts of the shift operating unit illustrated in FIGS. 13 to 17.

Turning now to FIGS. 5 to 7 and 12 to 18, the shift operating unit 38 will now be discussed. For the sake of brevity and for the ease of understanding basic operation of the shift operating unit 38 various non-essential parts, such as washers and bushings, will not be discussed and/or illustrated herein. As best seen in FIGS. 12 and 13, the shift operating unit 38 includes a first operating member 54 and a second operating member 56. The first operating member 54 is operated by the brake/shift lever 34, while the second operating member 56 is operated by the shift lever 36. As best seen in FIGS. 14, 15 and 18, the shift operating unit 38 further includes a cable take-up member or spool 58 for pulling and releasing the inner wire 21a of the shift control cable 21 in response to operation of the first and second operating member 54 and 56. The cable take-up member 58 can also be referred to as merely a take-up member, since other types of transmission elements can be used instead of the control cable 21.

In the illustrated embodiment, the first operating member 54 is provided with a pulling pawl 54a and a biasing element 54b for rotating the cable take-up member 58 in a first rotational direction R1. Thus, the first operating member 54 together with the pulling pawl 54a and the biasing element 54b constitutes a pulling or winding member, which is movably arranged with respect to the fixed member (e.g., the bracket 26). Also the first rotational direction R1 constitutes a pulling or winding direction of the inner wire 21a. The pulling pawl 54a and the biasing element 54b are supported on the first operating member 54 by a support pin 54c. The biasing element 54b is a torsion spring with its coiled portion disposed on the support pin 54c. A first free end of the biasing element 54b is hooked onto the pulling pawl 54a, while a second free end of the biasing element 54b is hooked onto the first operating member 54 for biasing the pulling pawl 54a towards an engagement position as discussed below.

Figure 20:
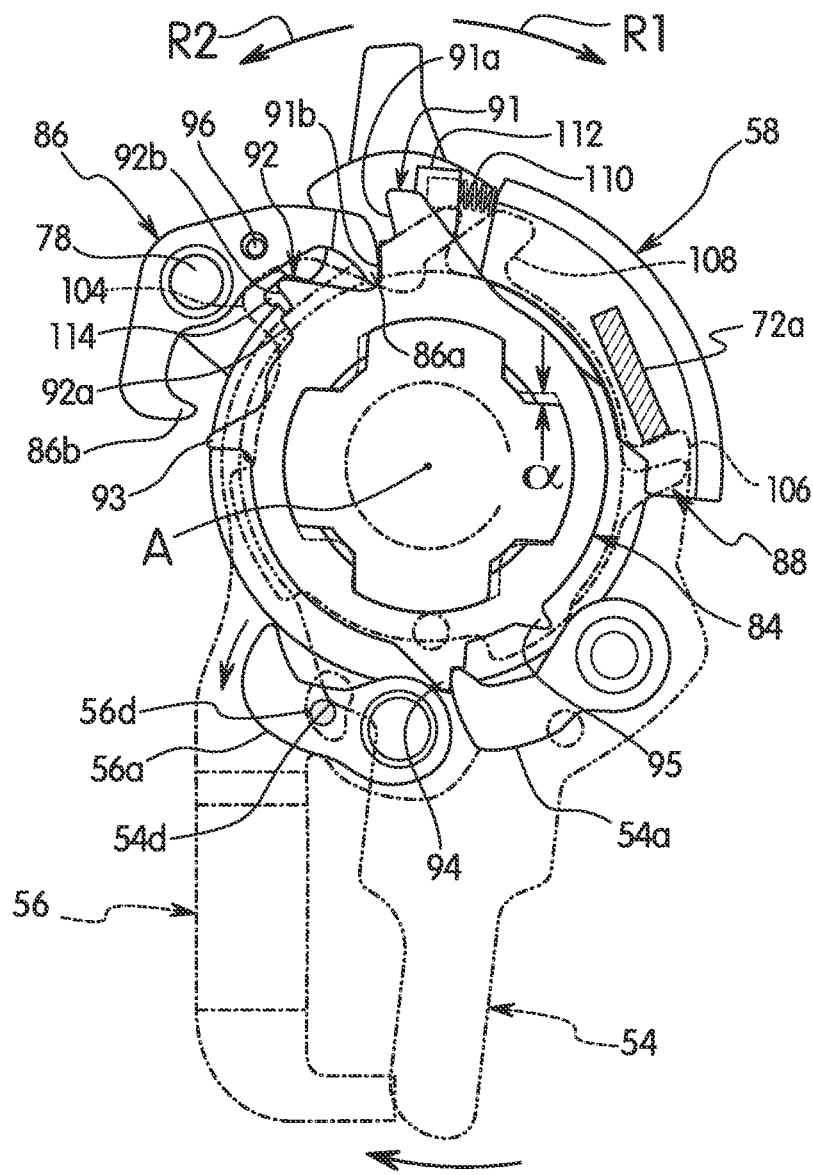
FIG. 20 is a front side elevational view of the selected parts of the shift operating unit illustrated in FIG. 19, but with the pull actuation member being rotated from the rest position of FIG. 19 to perform a shifting (pulling) operation from the first low guiding position (the innermost position) to the second low guiding position (the low trim position) that pulls an inner wire of a control cable.

On the other hand, the second operating member 56 is provided with a release pawl 56a and a biasing element 56b for rotating the cable take-up member 58 in a second rotational direction R2. Thus, the second rotational direction R2 constitutes a releasing direction of the inner wire 21a. The releasing pawl 56a and the biasing element 56b are supported on the second operating member 56 by a support pin 56c. The biasing element 56b is a torsion spring with its coiled portion disposed on the support pin 56c. A first free end of the biasing element 56b is hooked onto the releasing pawl 56a, while a second free end of the biasing element 56b is hooked onto the second operating member 56 for biasing the releasing pawl 56a towards an engagement position as discussed below. The releasing pawl 56a also has a pin 56d that extends through an opening in the second operating member 56. The pin 56d contacts an abutment on the first operating member 54 while the second operating member 56 is in its rest position. Thus, the pin 56d acts as a stop for establishing the rest position of the second operating member 56 as seen in FIG. 16. However, upon movement of the first operating member 54 in the first rotational direction R1 to perform a shifting operation, an abutment or contact part 54d of the first operating member 54 push will the pin 56d, which in turn will rotate the releasing pawl 56a against the biasing force of the biasing element 56b to a non-engagement position as seen in FIG. 20.

The cable take-up member 58 and the first and second operating members 54 and 56 are coaxially arranged on a main shift axle 60 of the shift operating unit 38. The main shift axle 60 defines a main rotational axis A of the shift operating unit 38. The main shift axle 60 pivotally supports the cable take-up member 58 and the first and second operating members 54 and 56 for pivotal movement with respect to the bracket 26. In the illustrated embodiment, the main rotational axis A is aligned with respect to the shift axes P2 and P3. Basically, the cable take-up member 58 pivots in opposite rotational directions about the main rotational axis A in response to operation of the first and second operating members 54 and 56 as discussed below.

In the illustrated embodiment, the cable take-up member 58 is biased in the first rotational direction R1 by a biasing element 62. The cable take-up member 58 constitutes a wire winding body or moving member. The cable take-up member 58 is pivotally supported on the main shift axle 60 to pivot with respect to the bracket 26 (e.g., the fixed member) in the first rotational direction R1 in response to the movement of the first operating member 54. Also the cable take-up member 58 is pivotally supported on the main shift axle 60 to pivot with respect to the bracket 26 (e.g., the fixed member) in the second rotational direction R2 in response to the movement of the second operating member 56. The first rotational direction R1 is an opposite rotational direction from the second rotational direction R2 with respect to the main rotational axis A.

As best seen in FIGS. 15 and 17, the cable take-up member 58 has a shift wire attachment structure 58a for attaching the inner wire 21a of the cable 21 thereto. Rotation of the cable take-up member 58 in the first rotational direction R1 results in the inner wire 21a of the cable 21 being wound on the peripheral edge of the cable take-up member 58. Conversely, rotation of the cable take-up member 58 in the second rotational direction R2 results in the inner wire 21a of the cable 21 being unwound from the peripheral edge of the cable take-up member 58. Other structures of the cable take-up member 58 will be discussed below.

Operation of the first operating member 54 causes the cable take-up member 58 to move in the first rotational direction R1 for pulling or winding the inner wire 21a. In other words, the first operating member 54 is pivoted in the first rotational direction R1 with respect to the main rotational axis A of the cable take-up member 58 by the brake/shift lever 34 to selectively operate the cable take-up member 58 in the first rotational direction R1. Basically, the first operating member 54 is operated by the rider pivoting the brake/shift lever 34 about the shift pivot axis P2 in the first rotational direction R1. As mentioned above, the shift lever 36 pivots with the brake/shift lever 34. In particular, the first operating member 54 has a contact member or flange 54e that contacts the shift lever 36 such that the shift lever 36 and the first and second operating members 54 and 56 are all pivoted in response to pivotally movement of the brake/shift lever 34. As a result, the brake/shift lever 34 is operatively coupled to the shift operating unit 38 to perform a cable pulling operation of the cable take-up member 58. As explained below, the brake/shift lever 34, the shift lever 36 and the first and second operating members 54 and 56 are all biased in the second rotational direction R2 to their respective rest positions. In this way, the brake/shift lever 34, the shift lever 36 and the first and second operating members 54 and 56 all return to their respective rest positions after the brake/shift lever 34 is released.

On the other hand, operation of the second operating member 56 causes the cable take-up member 58 to move in the second rotational direction R2 for releasing the inner wire 21a. The second operating member 56 is operated by the rider pivoting the shift lever 36 about the shift pivot axis P3. In particular, the second operating member 56 is contacted by the shift lever 36 such that the second operating member 56 is pivoted in response to pivotally movement of the shift lever 36. As a result, the shift lever 36 is operatively coupled to the shift operating unit 38 to perform a cable releasing operation of the cable take-up member 58.

In the illustrated embodiment, the second operating member 56 is pivoted in the first rotational direction R1 with respect to the main rotational axis A of the cable take-up member 58 by the shift lever 36 to selectively operate the cable take-up member 58 in the second rotational direction R2. As explained below, the shift lever 36 and the second operating member 56 are biased in the second rotational direction R2 to their respective rest positions such that the shift lever 36 and the second operating member 56 return to their respective rest positions after the shift lever 36 is released.

As seen in FIGS. 14 and 15, the shift operating unit 38 is provided with a rear mounting bolt 64 and a front brace 66 for supporting the shift operating unit 38 on the main body 30. In particular, the rear mounting bolt 64 extends through a hole in the main body 30, and then is threaded into a head portion of the main shift axle 60. In this way, the rear end of the shift operating unit 38 is supported within the internal cavity of the main body 30. The front brace 66 is located on a front portion end of the main shift axle 60. The front brace 66 is retained on the main shift axle 60 by a nut 68 that is threaded onto a threaded end portion of the main shift axle 60. The front brace 66 is secured to the main body 30 by a pair of screws 70. In this way, the front end of the shift operating unit 38 is supported within the internal cavity of the main body 30.

Referring now to FIGS. 14 to 18, the shift operating unit 38 further includes a first stationary plate 72, a second stationary plate 74 and a shift positioning mechanism 76. The first and second stationary plates 72 and 74 are rigid members that are all mounted on the main shift axle 60. The stationary plates 72 and 74 are non-movable with respect to the main body 30 of the bracket 26. The first stationary plate 72 is fixed to the second stationary plate 74 by a pivot pin 78. Thus, the first and second stationary plates 72 and 74 are fixed together and contact the main body 30 of the bracket 26 such that the first and second stationary plates 72 and 74 are held stationary by the main body 30. Thus, the stationary plates 72 and 74 constitute a part of the fixed member of the bicycle operating device 12. In other words, in the illustrated embodiment, the bracket 26 together with the stationary plates 72 and 74 primarily form the fixed member of the bicycle operating device 12. The winding member (e.g., the first operating member 54 together with the pulling pawl 54a and the biasing element 54b) is movably arranged with respect to the fixed member (e.g., the bracket 26 together and the stationary plates 72 and 74).

The first stationary plate 72 has a flange 72a that acts as a stop for establishing the rest position of the first operating member 54. The flange 72a of the first stationary plate 72 also acts as a stop for limiting the rotational movement of the second operating member 56 the first rotational direction R1. Also, since rotation of the first operating member 54 to perform a shifting operation also causes the second operating member 56 to move with the first operating member 54, the flange 72a also acts as a stop for limiting the rotational movement of the first operating member 54 in the first rotational direction R1.

The second stationary plate 74 provides an attachment point for the biasing element 62 of the cable take-up member 58. In particular, the biasing element 62 is a torsion spring that has a first end hooked on the second stationary plate 74 and a second end disposed in a hole in the cable take-up member 58. Thus, the biasing element 62 biases the cable take-up member 58 in the second rotational direction R2. Accordingly, the biasing element 62 is a return spring for the cable take-up member 58.

In the illustrated embodiment, the first operating member 54 is biased in the second rotational direction R2 by a biasing element 80. The biasing element 80 is a torsion spring with its coiled portion disposed on the main shift axle 60. A first free end of the biasing element 80 is disposed in a hole of the first operating member 54, while a second free end of the biasing element 80 is disposed in a hole of the brace 66. As mentioned above, the biasing element 80 is arranged for biasing the first operating member 54 to its rest position against the flange 72a of the first stationary plate 72.

In the illustrated embodiment, the second operating member 56 is biased in the second rotational direction R2 by a biasing element 82. The biasing element 82 is a torsion spring with its coiled portion disposed on the main shift axle 60. A first free end of the biasing element 82 is disposed in a hole of the second operating member 56, while a second free end of the biasing element 82 is hooked onto the flange 72a of the first stationary plate 72. The biasing element 82 is arranged for biasing the second operating member 56 to its rest position against the first operating member 54. In particular, the pin 56d abuts the first operating member 54 for establishing the rest position of the second operating member 56 as seen in FIG. 16.

The shift positioning mechanism 76 selectively maintains the cable take-up member 58 in any one of a plurality of different shift positions (e.g., four shift positions in the illustrated embodiment). The four shift positions of the shift positioning mechanism 76 correspond to the four guiding positions L1, L2, T1 and T2 of the chain guide 18a (see FIG. 8), discussed above. While the shift positioning mechanism 76 is illustrated as being configured for a drive train with only two front sprockets or chainrings, it will be apparent from this disclosure that the shift positioning mechanism 76 can be modified for use with a drive train with more than two front sprockets. Also the shift positioning mechanism 76 is not limited to be used with a front derailleur. Rather, it will be apparent from this disclosure that can be the shift positioning mechanism 76 can be modified for use in a bicycle operating device that is used for other types of bicycle components.

In the illustrated embodiment, the shift positioning mechanism 76 basically includes a positioning ratchet 84, a positioning pawl or member 86, a releasing member or plate 88 and a shift position preventing member 90 for establishing the four guiding positions L1, L2, T1 and T2 of the chain guide 18a (see FIG. 8). The positioning ratchet 84, the releasing member 88 and the preventing member 90 are coaxially arranged with the cable take-up member 58 on the main shift axle 60. The positioning ratchet 84 and the preventing member 90 are arranged to rotate with the cable take-up member 58 on the main shift axle 60, while the releasing member 88 rotates relative to the cable take-up member 58 on the main shift axle 60.

Basically, the cable take-up member 58 is fixed to the positioning ratchet 84 and the positioning pawl or member 86 selectively engages the positioning ratchet 84 to hold the positioning ratchet 84 and the cable take-up member 58 from rotating due to the biasing force from the biasing element 62. By pivoting the first operating member 54 in the first rotational direction R1, the positioning ratchet 84 can be rotated by the pulling pawl 54a of the first operating member 54 engages the positioning ratchet 84 to rotate the cable take-up member 58 and the positioning ratchet 84 together in the first rotational direction R1 against the biasing force of the biasing element 62. On the other hand, by pivoting the second operating member 56 in the first rotational direction R1, the positioning ratchet 84 can be rotated by the release pawl 56a of the second operating member 56 engages the positioning ratchet 84 to rotate the cable take-up member 58 and the positioning ratchet 84 together in the second rotational direction R2 due to the biasing force of the biasing element 62. The positioning pawl 86 selectively engages the positioning ratchet 84 to hold the cable take-up member 58 from rotating on the main shift axle 60 in the second rotational direction R2 as explained below.

The positioning ratchet 84 will now be discussed in more detail. As best seen in FIG. 18, the positioning ratchet 84 is a rigid ring shaped member having a peripheral edge 84a and a non-circular center opening 84b. The positioning ratchet 84 is fixedly coupled to the cable take-up member 58 to move with the cable take-up member 58 on the main shift axle 60. In particular, the non-circular center opening 84b of the positioning ratchet 84 non-rotatably mates with a projecting hub part 58b such that the cable take-up member 58 and the positioning ratchet 84 move together as a unit on the main shift axle 60. In other words, the positioning ratchet 84 rotates with the cable take-up member 58. While the cable take-up member 58 and the positioning ratchet 84 are shown as separate members, it will be apparent from this disclosure that the cable take-up member 58 and the positioning ratchet 84 can be a one-piece, unitary member as needed and/or desired.

In the illustrated embodiment, the peripheral edge 84a of the positioning ratchet 84 includes a first positioning tooth 91, a second positioning tooth 92, a stop tooth 93, a first pulling tooth 94 and a second pulling tooth 95. Basically, the positioning teeth 91 and 92 and the stop tooth 93 are selectively engaged by the positioning pawl 86 to maintain a prescribed position of the cable take-up member 58 relative to the fixed member (e.g., the bracket 26 together and the stationary plates 72 and 74). On the other hand, the pulling teeth 94 and 95 are selectively engaged by the pulling pawl 54a to rotate the cable take-up member 58 in the first rotational direction R1 as discussed below.

Thus, the positioning teeth 91 and 92 form abutments that are selectively engaged with the positioning pawl 86. The positioning teeth 91 and 92 of the positioning ratchet 84 move along a movement path such that the positioning pawl 86 selectively move into and out of the movement path of the positioning teeth 91 and 92 to control the movement of the positioning ratchet 84. The first positioning tooth 91 includes a low engaging portion 91a and a low-trim engaging portion 91b, while the second positioning tooth 92 includes a top engaging portion 92a and a top-trim engaging portion 92b. These engaging portions 91a, 91b, 92a and 92b establish the various stop positions of the cable take-up member 58. The low engaging portion 91a establishes a first endmost position of the cable take-up member 58 with respect to the first and second rotational directions R1 and R2. On the other hand, the top engaging portion 92a establishes a second endmost position of the cable take-up member 58 with respect to the first and second rotational directions R1 and R2. The low-trim engaging portion 91b and the top-trim engaging portion 92b establish intermediate positions of the cable take-up member 58 with respect to the first and second rotational directions R1 and R2.

The low engaging portion 91a can also be considered a first engaging portion that is engaged with the positioning pawl 86 to establish the first endmost position of the cable take-up member 58. The top engaging portion 92a can also be considered a second engaging portion that is engaged with the positioning pawl 86 to establish a second endmost position of the cable take-up member 58. The low-trim engaging portion 91b and the top-trim engaging portion 92b can also be considered intermediate engaging portions that are individually engaged with the positioning pawl 86 to establish intermediate positions of the cable take-up member 58 between the low engaging portion 91a and the top engaging portion 92a (the first and second engaging portions). In the illustrated embodiment, the low-trim engaging portion 91b is positioned closer to the low engaging portion 91a than to either of the top engaging portion 92a or the top-trim engaging portion 92b. Similarly, the top-trim engaging portion 92b is positioned closer to the top engaging portion 92a than to either of the low engaging portion 91a or the low-trim engaging portion 91b.

The positioning pawl 86 will now be discussed in more detail. As best seen in FIGS. 18 to 32, the positioning pawl 86 is pivotally mounted on the pivot pin 78. In particular, the positioning pawl 86 is movably arranged with respect to the fixed member (e.g., the bracket 26 and the stationary plates 72 and 74). In this way, the positioning pawl 86 moves between a non-holding position and a holding position. The positioning pawl 86 is disposed in the holding position while the shift positioning mechanism 76 is in the rest position. Thus, in the holding position, the positioning pawl 86 selectively engages one of the first and second positioning teeth 91 and 92 of the positioning ratchet 84 to prevent the cable take-up member 58 from moving in the second rotational direction R2 due to the biasing force of the biasing element 62. In other words, in the holding position, the positioning pawl 86 selectively engages one of the first and second positioning teeth 91 and 92 of the positioning ratchet 84 for holding the cable take-up member 58 in one of the four chain guiding positions L1, L2, T1 and T2 (see FIG. 8) against rotation due to the biasing force of the biasing element 62. In the non-holding position, the positioning pawl 86 is disengaged from the first and second positioning teeth 91 and 92 of the positioning ratchet 84 by the releasing member 88.

The positioning pawl 86 includes a first (holding) tooth 86a that selectively engages the positioning teeth 91 and 92 are to maintain a prescribed position of the cable take-up member 58 relative to the fixed member (e.g., the bracket 26 together and the stationary plates 72 and 74) as mentioned above. The positioning pawl 86 also includes a second (stopping) tooth 86b that selectively engages the stop tooth 93 (see FIG. 28) to prevent the cable take-up member 58 from rotating too far in the second rotational direction R2 during a releasing operation. Thus, the positioning pawl 86 integrally includes a stopping member having the second (stopping) tooth 86b that moves with the first (holding) tooth 86a in a see-saw manner on the pivot pin 78. Since the positioning pawl 86 is pivotally mounted on the pivot pin 78, the stopping member of the positioning pawl 86 is movably mounted with respect to the fixed member (e.g., the bracket 26 together and the stationary plates 72 and 74) between a non-stop or unrestricting position (i.e., the rest position in the illustrated embodiment) and a stop position. The stop position of the second (stopping) tooth 86b prevents movement of the cable take-up member 58 in the second rotational direction R2 while the releasing member 88 is at the releasing position. In particular, in the stop position, the second (stopping) tooth 86b is located along the path of the positioning ratchet 84 by the releasing member 88 to catch the stop tooth 93 and hold the cable take-up member 58 from moving in the second rotational direction R2. The stop position of the second (stopping) tooth 86b also corresponds to the non-holding position of the first (holding) tooth 86a of the positioning pawl 86. In the non-stop (rest) position, the second (stopping) tooth 86b is located out of the path of the positioning ratchet 84. While the second (stopping) tooth 86b of the stopping member and the positioning pawl 86 are illustrated as a one-piece member, the second (stopping) tooth 86b of the stopping member and the positioning pawl 86 can be separate members that are coupled together to move as a unit.

In the illustrated embodiment, as seen in FIGS. 14 and 18, the positioning pawl. 86 is biased by a biasing element 96 such that the first (holding) tooth 86a is engaged with one of the positioning teeth 91 and 92 of the positioning ratchet 84 while the shift positioning mechanism 76 is in the rest position. On the other hand, the second (stopping) tooth 86b is disposed outside of the path of the positioning teeth 91 and 92 and the stop tooth 93 while the shift positioning mechanism 76 is in the rest position. In this way, the first (holding) tooth 86a automatically engages the positioning teeth 91 and 92 during a shifting operation due to the biasing force of the biasing element 96. In the illustrated embodiment, the biasing element 96 is a torsion spring with its coiled portion disposed on the pivot pin 78. A first free end of the biasing element 96 is disposed in a hole of the positioning pawl 86, while a second free end of the biasing element 96 is hooked on to the second stationary plate 74.

The releasing member or plate 88 will now be discussed in more detail. As best seen in FIGS. 18 to 32, the releasing member 88 is a rigid part that is made of a suitable rigid material. The releasing member 88 is movably arranged with respect to the fixed member (e.g., the bracket 26 together and the stationary plates 72 and 74) between a non-releasing position and a releasing position such that the releasing member 88 rotates the positioning pawl 86. In particular, the releasing member 88 is arranged relative to the positioning pawl 86 such that the releasing member 88 contacts the positioning pawl 86 and disengages the positioning pawl 86 from the positioning ratchet 84 while the releasing member 88 is at the releasing position. More specifically, the releasing member 88 rotates the positioning pawl 86 by contacting the first (holding) tooth 86a such that the first (holding) tooth 86a moves from the holding position to the non-holding position, and such that the second (stopping) tooth 86b moves from the non-stop position to the stop position.

As best seen in FIG. 18, the releasing member 88 has a peripheral edge 88a and a circular center opening 88b. The releasing member 88 is rotatably arranged on the main shift axle 60 and can rotate relative to the cable take-up member 58 and the positioning ratchet 84. The releasing member 88 is biased in the second rotational direction R2 by a biasing element 98. In the illustrated embodiment, the biasing element 98 is a torsion spring with its coiled portion disposed on the main shift axle 60. A first free end of the biasing element 98 is disposed in a hole of the releasing member 88, while a second free end of the biasing element 98 is hooked onto the flange 72a of the first stationary plate 72.

The peripheral edge 88a of the releasing member 88 has a first contact part 102 that is selectively engaged by the release pawl 56a of the second operating member 56 during a releasing operation of the shift lever 36 in the first rotational direction R1. In particular, as the second operating member 56 during a releasing operation of the shift lever 36 in the first rotational direction R1, the release pawl 56a engages the first contact part 102 and rotates the releasing member 88 in the first rotational direction R1 from the non-releasing (rest) position to the releasing position.

The peripheral edge 88a of the releasing member 88 also has a second contact part 100 for moving the pulling pawl 54a out of the path of the pulling teeth 94 and 95 of the positioning ratchet 84. In particular, as the releasing member 88 in the first rotational direction R1, the second contact part 100 comes in to contact with the pulling pawl 54a to pivot the tooth or abutment of the pulling pawl 54a out of the path of the pulling teeth 94 and 95 of the positioning ratchet 84. In other words, the second contact part 100 pivots the pulling pawl 54a from a rest position to a disabled position as the releasing member 88 is rotated by the release pawl 56a during a releasing operation of the shift lever 36 in the first rotational direction R1. In this way, the pulling pawl 54a does not engage the pulling teeth 94 and 95 of the positioning ratchet 84 during a releasing operation of the shift lever 36 in the first rotational direction R1.

The peripheral edge 88a of the releasing member 88 has a third contact part 104 for moving the positioning pawl 86 out of engagement of the positioning ratchet 84. In particular, the third contact part 104 pivots the positioning pawl 86 from the holding position to the non-holding position as the releasing member 88 is rotated by the release pawl 56a from the non-releasing (rest) position to the releasing position during a releasing operation of the shift lever 36 in the first rotational direction R1.

The peripheral edge 88a of the releasing member 88 has a first stop or abutment 106 and a second stop or abutment 108. The first and second stops 106 and 108 define the range of movement of the releasing member 88. The first stop 106 is biased against the flange 72a of the first stationary plate 72 by the biasing element 96. Thus, the first stop 106 establishes the rest position of the releasing member 88. The second stop 108 limits the range of movement in the first rotational direction R1 of the releasing member 88.

The preventing member 90 will now be discussed in more detail. As best seen in FIG. 18, the preventing member 90 is a rigid ring shaped member that has a peripheral edge 90a and a non-circular center opening 90b. Basically, the preventing member 90 is coupled to the cable take-up member 58 to move with the cable take-up member 58 and the positioning ratchet 84 on the main shift axle 60. However, a limited amount of rotational play is provided between the preventing member 90 and the cable take-up member 58 and the positioning ratchet 84 on the main shift axle 60. This limited amount of rotational play is taken up by a biasing element 110 (e.g., a compression spring) that is operatively disposed between the cable take-up member 58 and the preventing member 90. The biasing element 110 has a first end that is disposed in a bore formed in a flange 112 of the preventing member 90 and a second end disposed in a bore formed in the cable take-up member 58. In this way, the preventing member 90 is biased in the second rotational direction R2 with respect to the cable take-up member 58 by the biasing element 110.

In particular, the non-circular center opening 90b of the preventing member 90 mates with the projecting hub part 58b such that the preventing member 90 can rotate relative to the positioning ratchet 84 by a prescribed angular movement amount α. In other words, the preventing member 90 is movably arranged with respect to the positioning ratchet 84. On the other hand, the preventing member 90 and the cable take-up member 58 move together as a unit as the winding member (e.g., the first operating member 54 and the positioning ratchet 84 together with the pulling pawl 54a and the biasing element 54b) moves the cable take-up member 58 in the first rotational direction R1. In this way, the preventing member 90 prevents the positioning pawl 86 from engaging the top-trim engaging portion 92b (i.e., one of the intermediate engaging portions) of the positioning ratchet 84 while the winding member (e.g., the first operating member 54 together with the pulling pawl 54a and the biasing element 54b) moves the cable take-up member 58 in the first rotational direction R1.

Due to the biasing element 110, the cable take-up member 58 and the preventing member 90 normally move together as a unit on the main shift axle 60. The exception to this situation of the cable take-up member 58 and the preventing member 90 moving together as a unit occurs when a releasing operation is performed in which the positioning pawl 86 moves from the top engaging portion 92a to the top-trim engaging portion 92b. In such a case, the positioning pawl 86 engages the preventing member 90 to move the preventing member 90 against the biasing force of the biasing element 110. In this way, the preventing member 90 compresses the biasing element 110 and moves relative to the cable take-up member 58 and the positioning ratchet 84 by the prescribed angular movement amount a. In other words, the preventing member 90 moves from a blocking position to an unblocking position. Thus, the preventing member 90 rotates with the cable take-up member 58.

As best seen in FIGS. 18 to 32, the preventing member 90 has a blocking part 114 that extends outwardly from the peripheral edge 90a. The blocking part 114 is normally held in a blocking position by the biasing element 110 so that the first (holding) tooth 86a of the positioning pawl 86 cannot engage the top-trim engaging portion 92b during a winding or pulling operation. Accordingly, the blocking part 114 is normally aligns with the top-trim engaging portion 92b with respect to the axial direction of the main shift axle 60.

Figure 19:
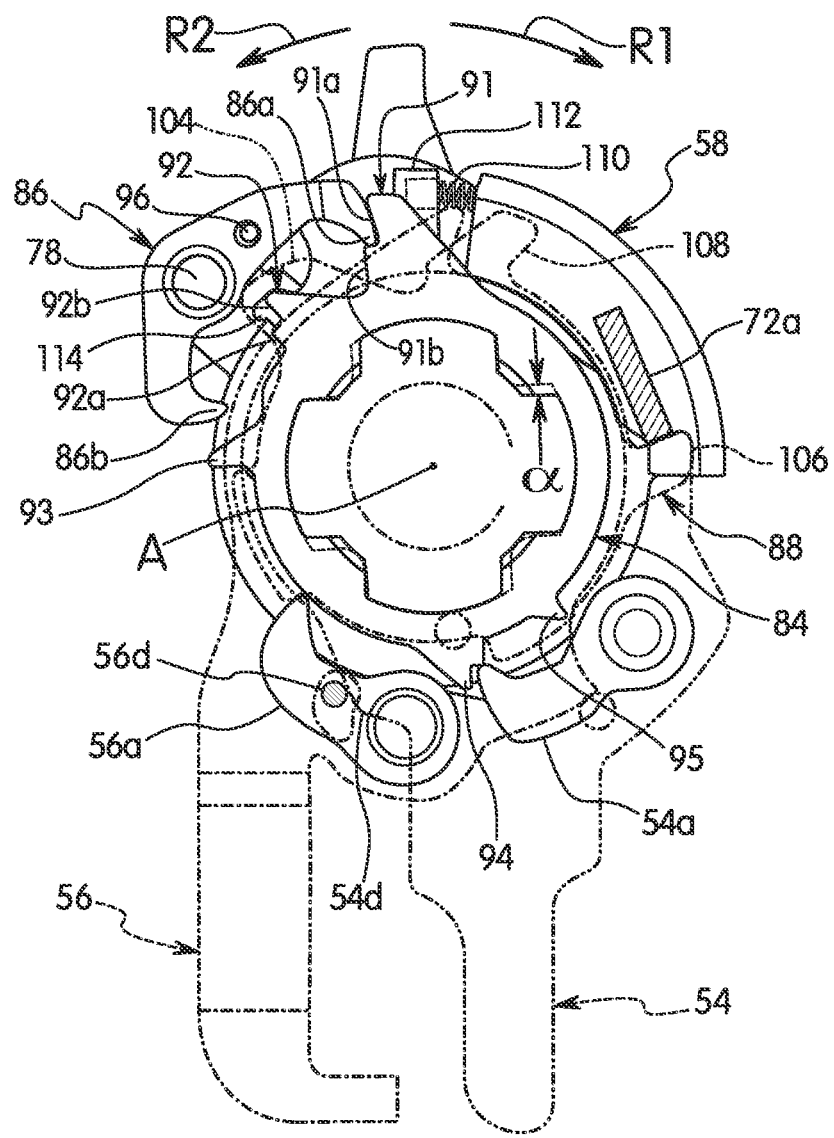
FIG. 19 is a front side elevational view of selected parts of the shift operating unit as viewed along the center axis of the main shift axle, with the control members in their rest positions and the shift operating unit being in a fully released position such that the front derailleur is held in the first low guiding position (the innermost position) with the chain on the inner gear.
Figure 21:
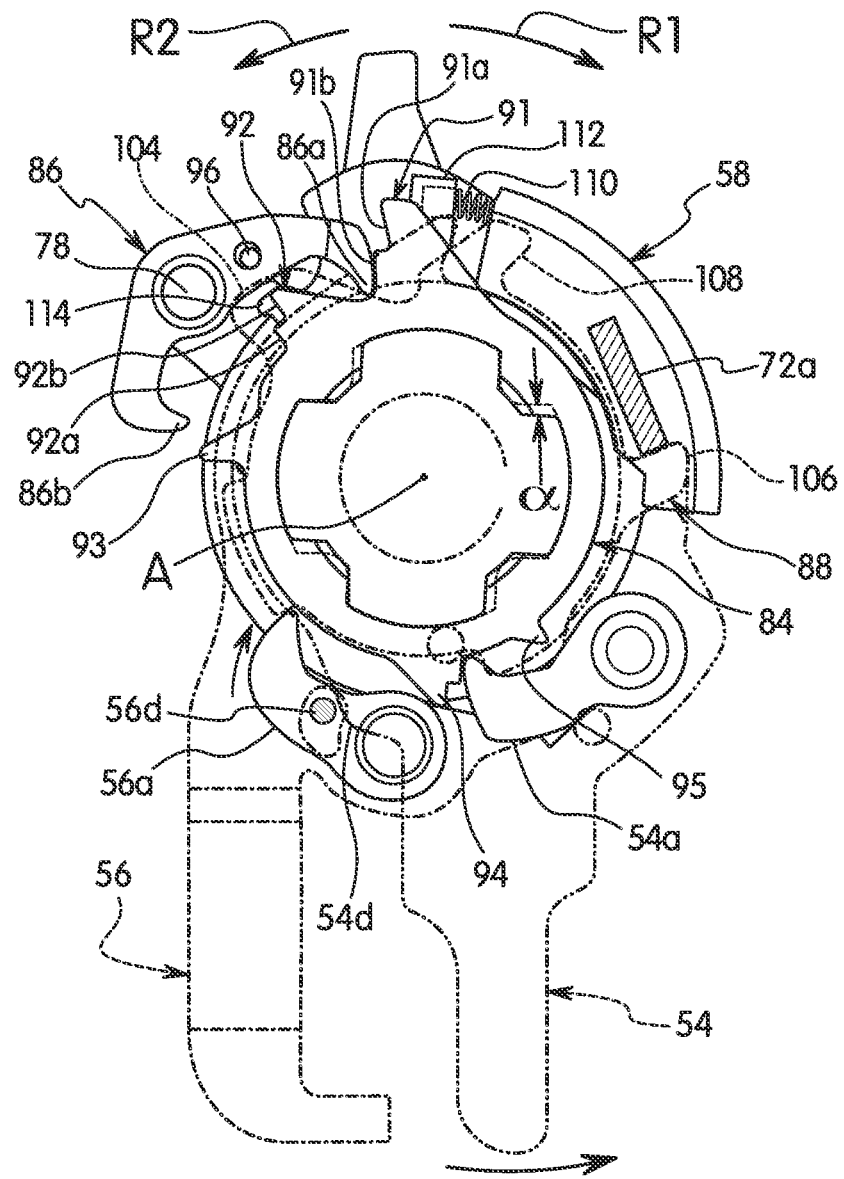
FIG. 21 is a front side elevational view of the selected parts of the shift operating unit illustrated in FIGS. 19 and 20, but with the pull actuation member being rotated back to the rest position from the position of FIG. 21.
Figure 22:
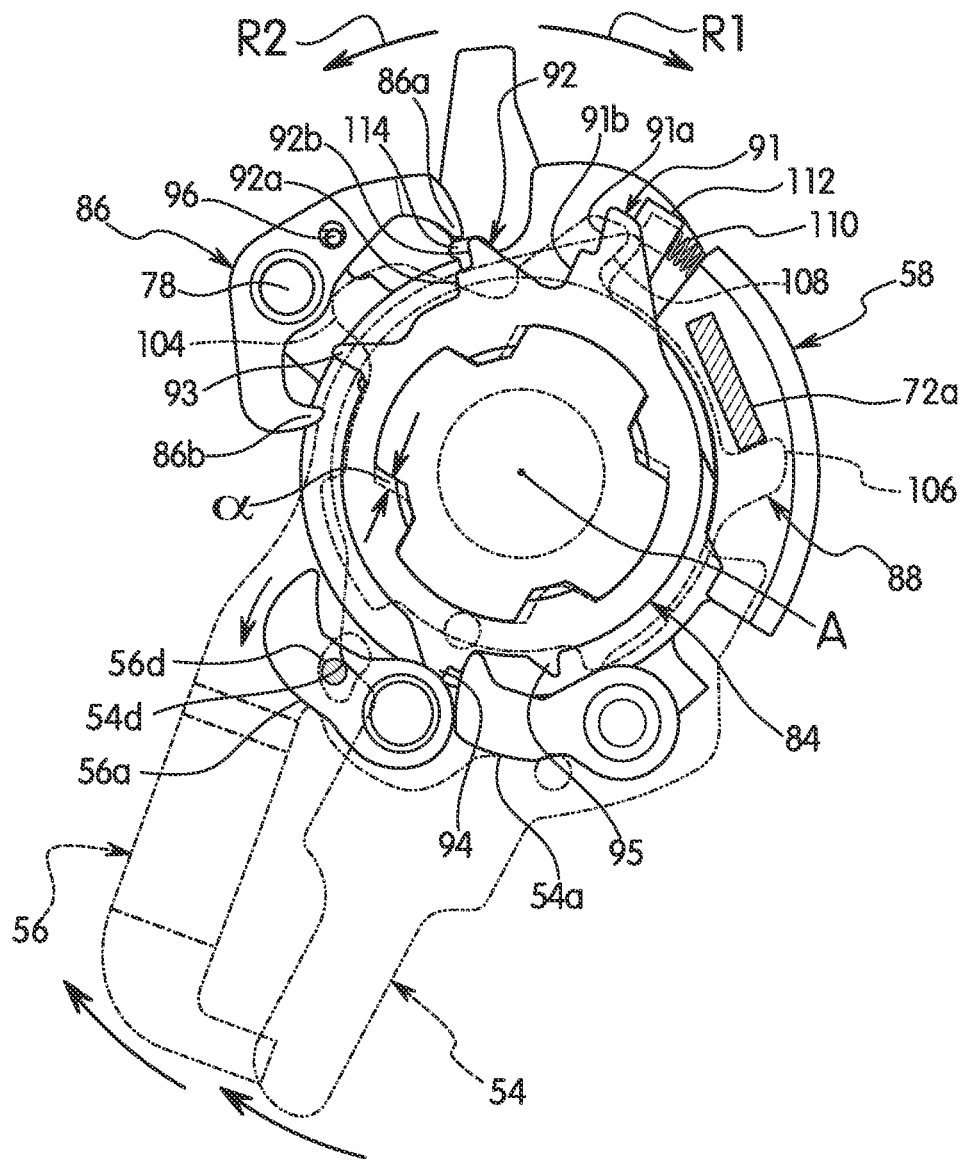
FIG. 22 is a front side elevational view of the selected parts of the shift operating unit illustrated in FIGS. 19 to 21, but with the pull actuation member being partially rotated from the rest position of FIG. 21 to begin a shifting (pulling) operation from the second low guiding position (the low trim position)
Figure 23:
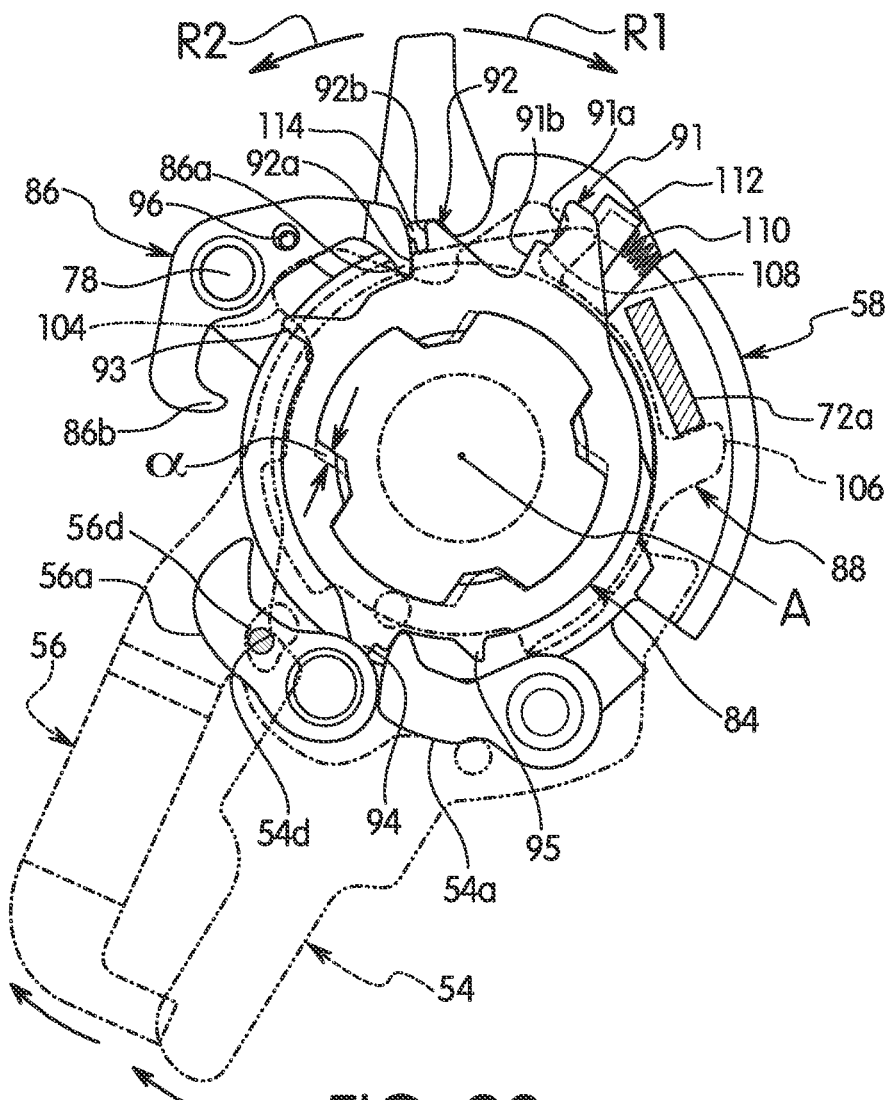
FIG. 23 is a front side elevational view of the selected parts of the shift operating unit illustrated in FIGS. 19 to 22, but with the pull actuation member being rotated further from the partially shifted position of FIG. 22 to complete the shifting (pulling) operation from the second low guiding position (the low trim position) to the second top guiding position (the outermost position)
Figure 24:
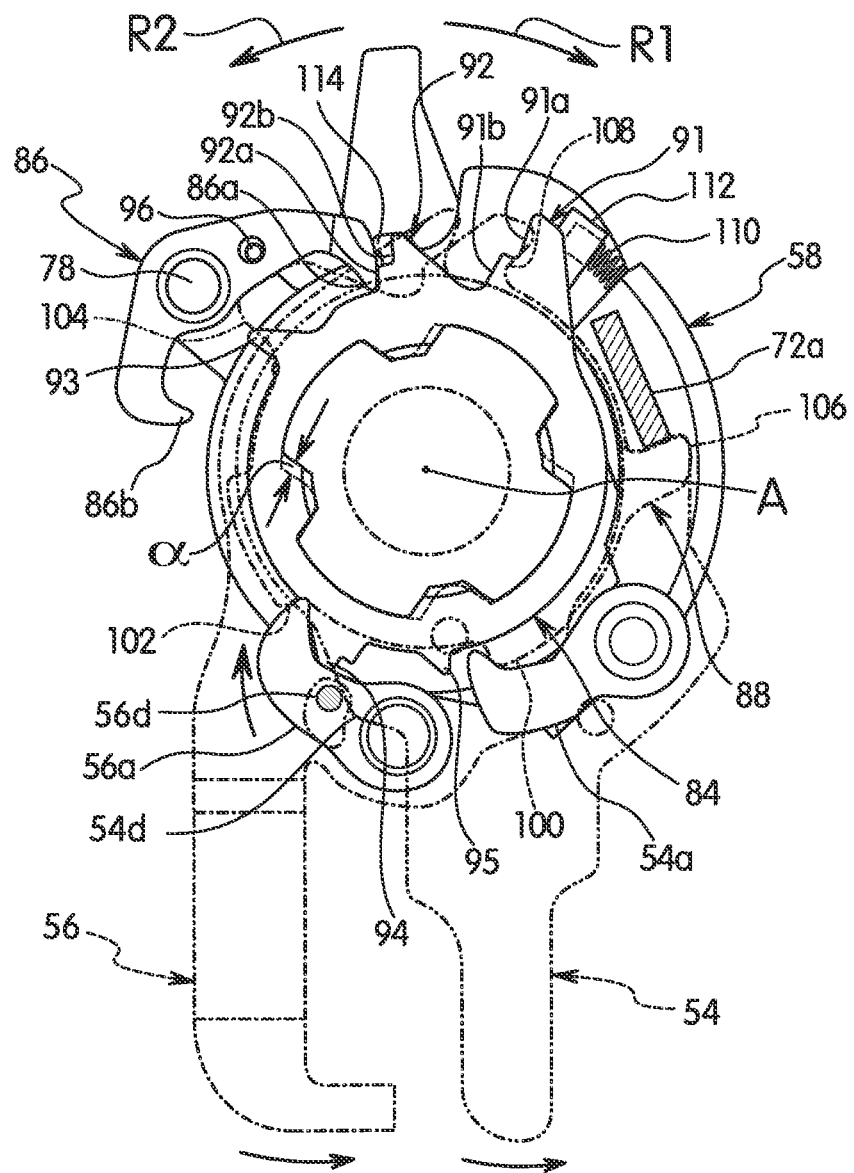
FIG. 24 is a front side elevational view of the selected parts of the shift operating unit illustrated in FIGS. 19 to 23, but with the pull actuation member being rotated back to the rest position from the position of FIG. 23.

A cable pulling or winding operation of the shift operating unit 38 will now be discussed with reference primarily to FIGS. 19 to 24 and 32. FIGS. 19, 21 and 24 illustrate rest positions, while FIGS. 20, 22 and 23 illustrate intermediate shifting positions. Basically, cable pulling operations of the shift operating unit 38 are performed by the rider pivotally moving the brake/shift lever 34 about the shift pivot axis P2 in the lateral inward direction towards the bicycle longitudinal center plane. The brake/shift lever 34 is operated in a single progressive movement such that in the first operating member 54 moves in a single progressive movement in the first rotational direction R1 from one of the shift or guiding positions to the next adjacent shift or guiding position.

As mentioned above, a cable pulling or winding operation of the shift operating unit 38 is performed by the rider pivotally moving the brake/shift lever 34. This pivotal movement of the brake/shift lever 34 is transmitted to the first operating member 54 such that the first operating member 54 is rotated in the first rotational direction R1 from its rest position (e.g., FIGS. 19, 21 and 24) to an intermediate shifting position (e.g., FIGS. 20, 22 and 23). As the first operating member 54 rotates in the first rotational direction R1, the abutment or contact part 54d of the first operating member 54 contacts the pin 56d, which in turn will rotate the releasing pawl 56a against the biasing force of the biasing element 56b to a non-engagement position as seen in FIGS. 20 and 22. Also as the first operating member 54 rotates in the first rotational direction R1, the pulling pawl 54a engages one of the first and second pulling teeth 94 and 95 of the positioning ratchet 84 to rotate the cable take-up member 58, the positioning ratchet 84 and the preventing member 90 in the first rotational direction R1. As the positioning ratchet 84 rotates in the first rotational direction R1, the first (holding) tooth 86a of the positioning pawl 86 will selectively engages the next one of the engaging portions 91a, 91b and 92a of the positioning teeth 91 and 92. As mentioned above, as seen in FIG. 22, the first (holding) tooth 86a of the positioning pawl 86 is blocked from engaging the top-trim engaging portion 92b during a cable winding or pulling operation. Once the user releases the brake/shift lever 34, the cable take-up member 58, the positioning ratchet 84 and the preventing member 90 is now held in the next position. The first operating member 54 will then returned to the rest position by the biasing element 80 and the second operating member 56 will then returned to the rest position by the biasing element 82.

A cable releasing operation of the shift operating unit 38 will now be discussed with reference primarily to FIGS. 24 to 31. Cable releasing operations of the shift operating unit 38 are performed by the rider pivotally moving the shift lever 36 about the shift pivot axis P3 in the lateral inward direction towards the bicycle longitudinal center plane. The shift lever 36 is operated in a single progressive movement such that in the second operating member 56 moves in a single progressive movement in the first rotational direction R1 from the current shift position to the next adjacent shift position.

Figure 25:
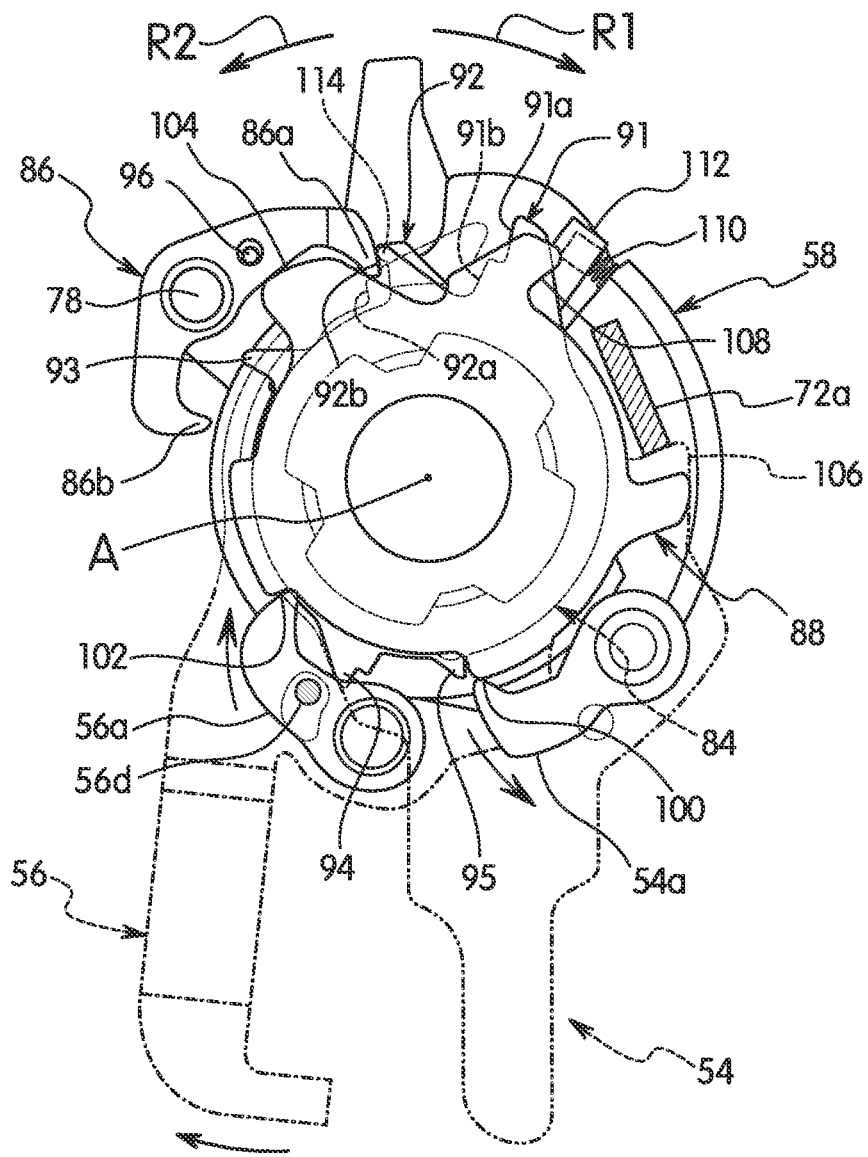
FIG. 25 is a front side elevational view of the selected parts of the shift operating unit illustrated in FIGS. 19 to 24, but with the release actuation member being rotated from the rest position of FIG. 24 to perform a shifting (releasing) operation from the second top guiding position (the outermost position) to the first top guiding position (the top trim position) that releases an inner wire of a control cable.
Figure 26:
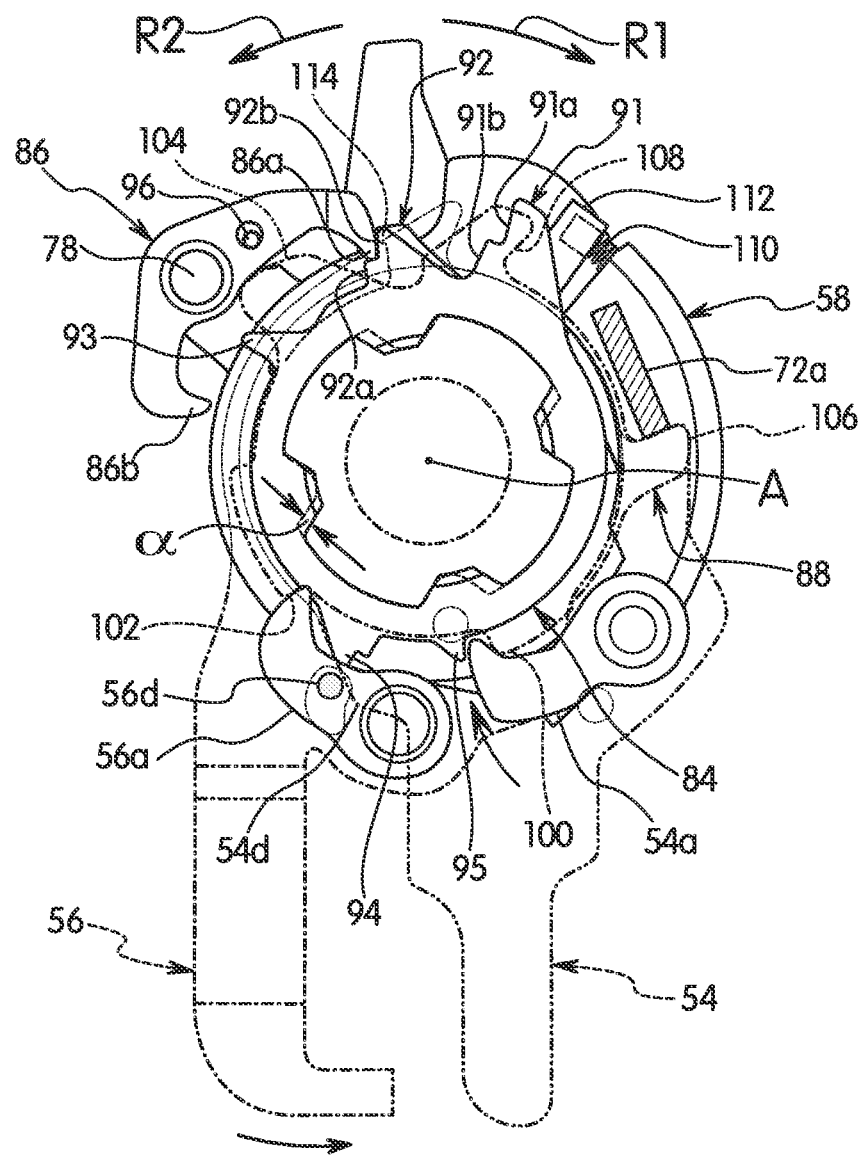
FIG. 26 is a front side elevational view of the selected parts of the shift operating unit illustrated in FIGS. 19 to 25, but with the release actuation member being rotated back to the rest position from the position of FIG. 25.
Figure 27:
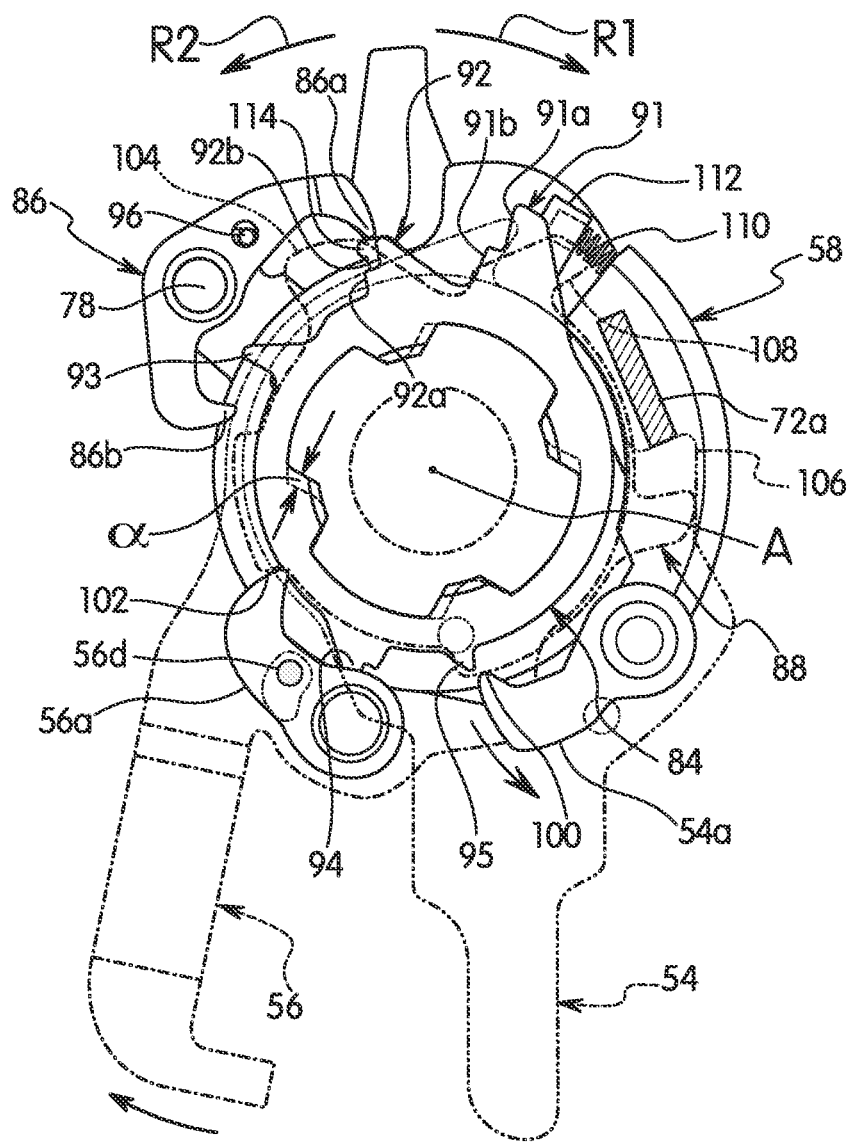
FIG. 27 is a front side elevational view of the selected parts of the shift operating unit illustrated in FIGS. 19 to 26, but with the release actuation member being partially rotated from the rest position of FIG. 26 to begin a shifting (releasing) operation from the first top guiding position (the top trim position)
Figure 28:
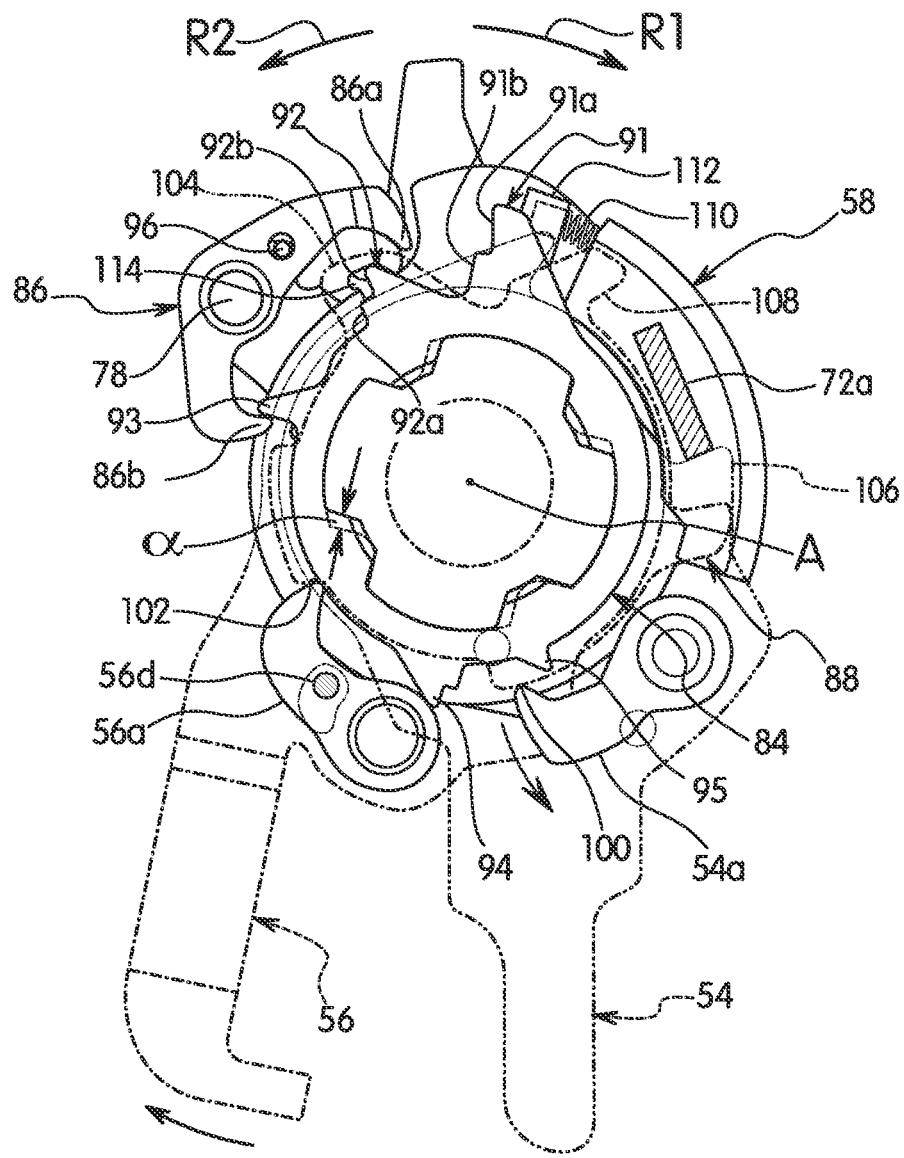
FIG. 28 is a front side elevational view of the selected parts of the shift operating unit illustrated in FIGS. 19 to 27, but with the release actuation member being rotated to complete the shifting (releasing) operation from the first top guiding position (the top trim position) to the second low guiding position (the low trim position)
Figure 29:
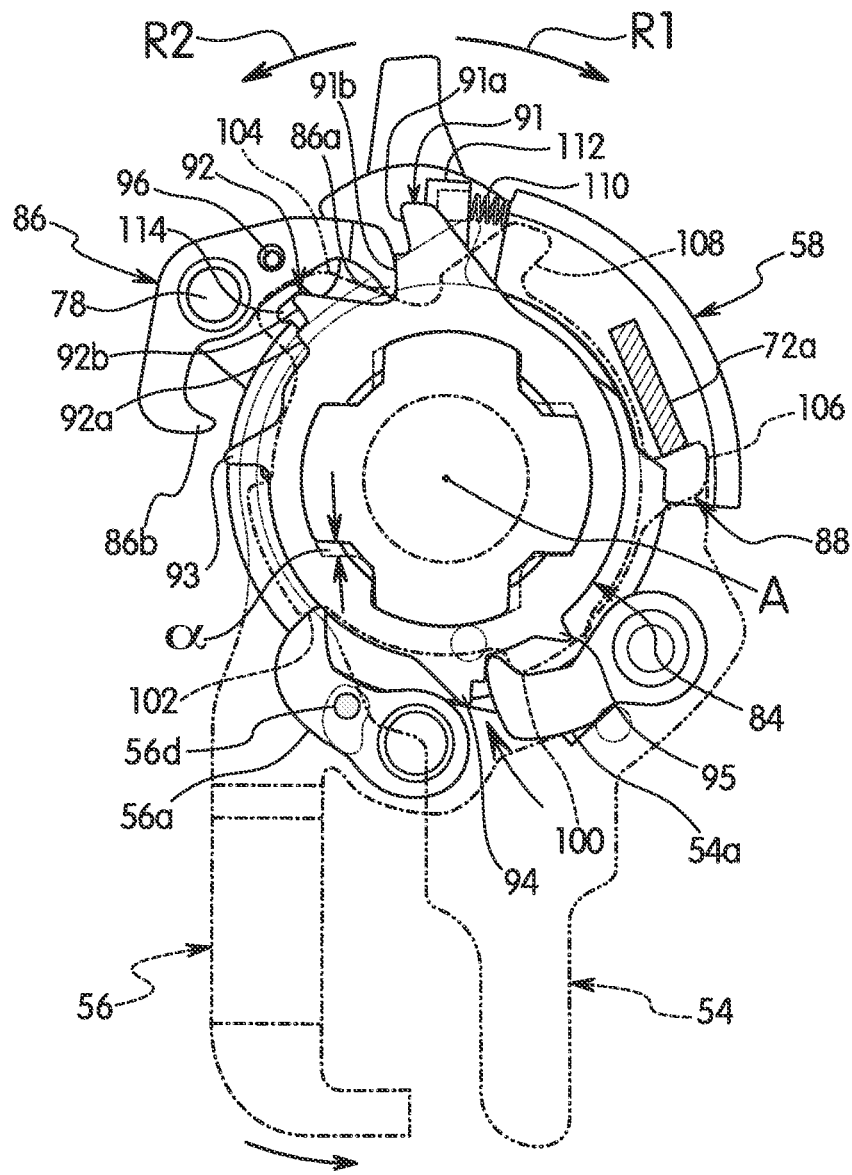
FIG. 29 is a front side elevational view of the selected parts of the shift operating unit illustrated in FIGS. 19 to 28, but with the release actuation member being rotated back to the rest position from the position of FIG. 28.
Figure 30:
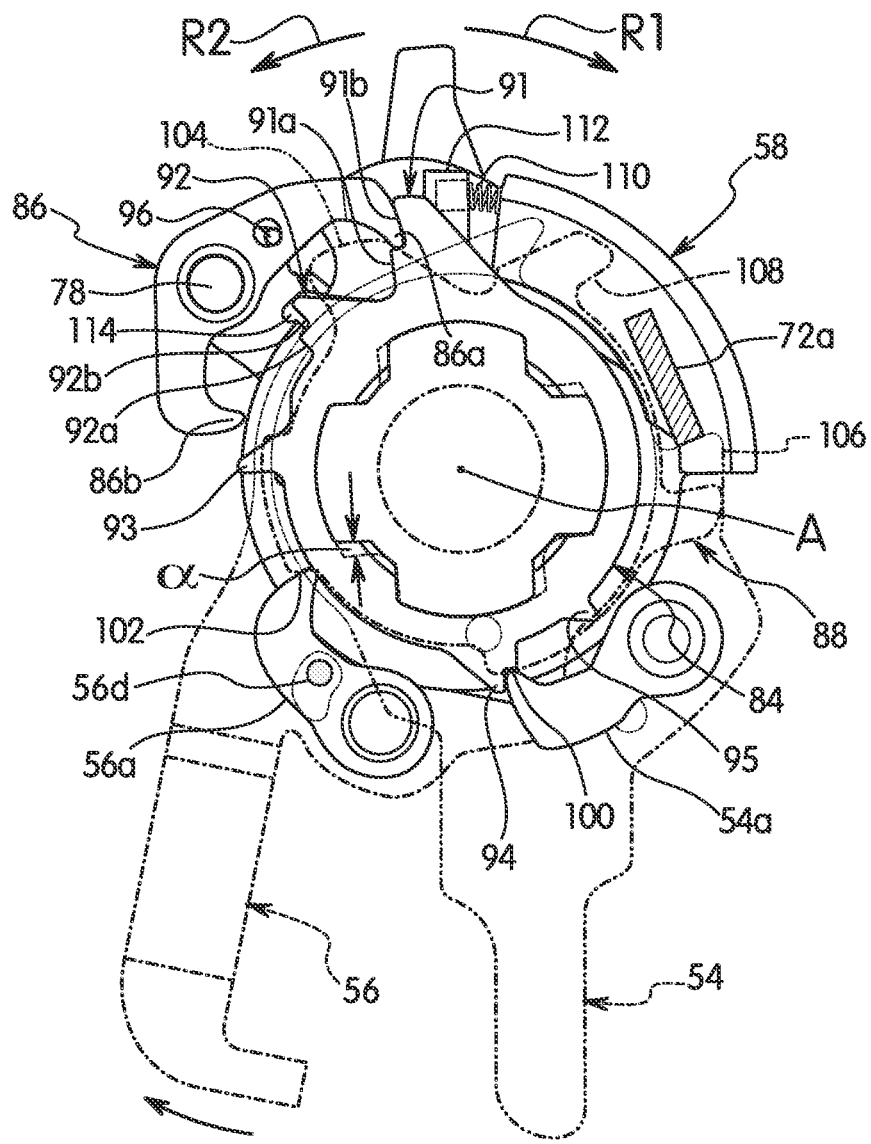
FIG. 30 is a front side elevational view of the selected parts of the shift operating unit illustrated in FIGS. 19 to 29, but with the release actuation member being rotated from the rest position of FIG. 28 to perform a shifting (releasing) operation from the second low guiding position (the low trim position) to the first low guiding position (the innermost position)
Figure 31:
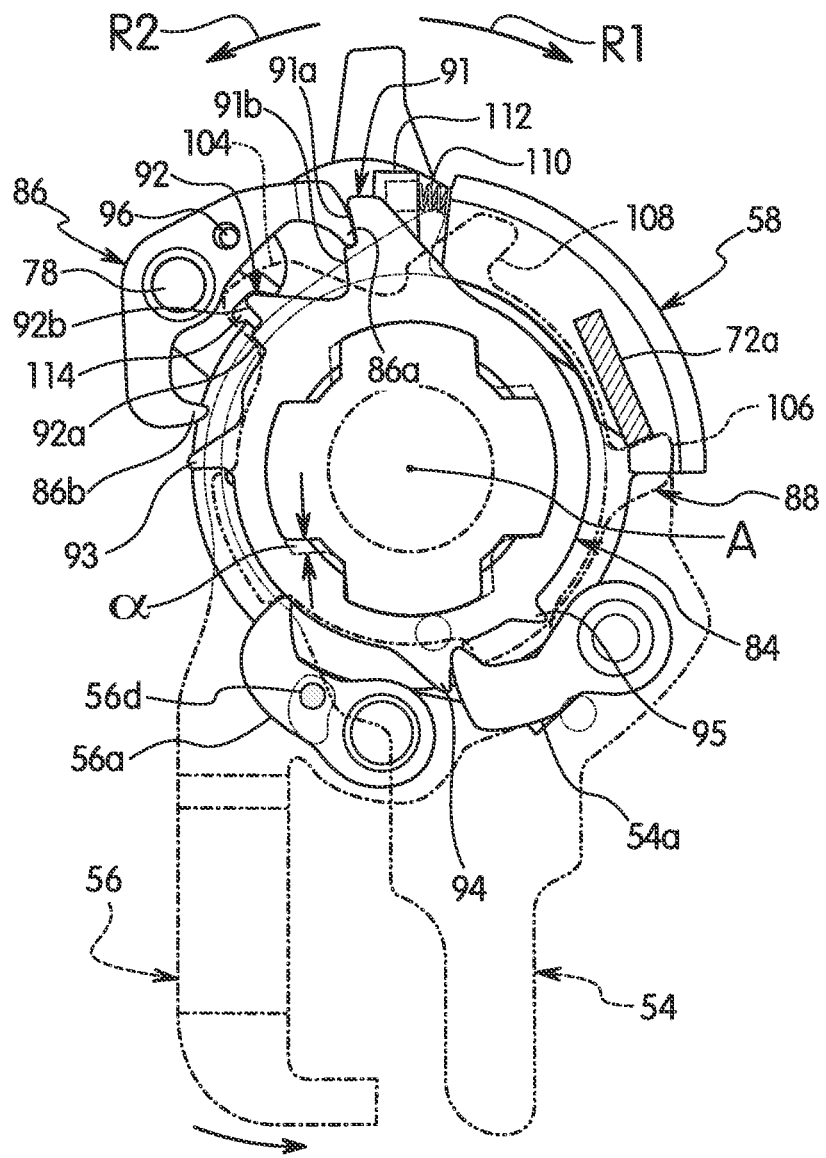
FIG. 31 is a front side elevational view of the selected parts of the shift operating unit illustrated in FIGS. 19 to 30, but with the release actuation member being rotated back to the rest position from the position of FIG. 30.
Figure 32:
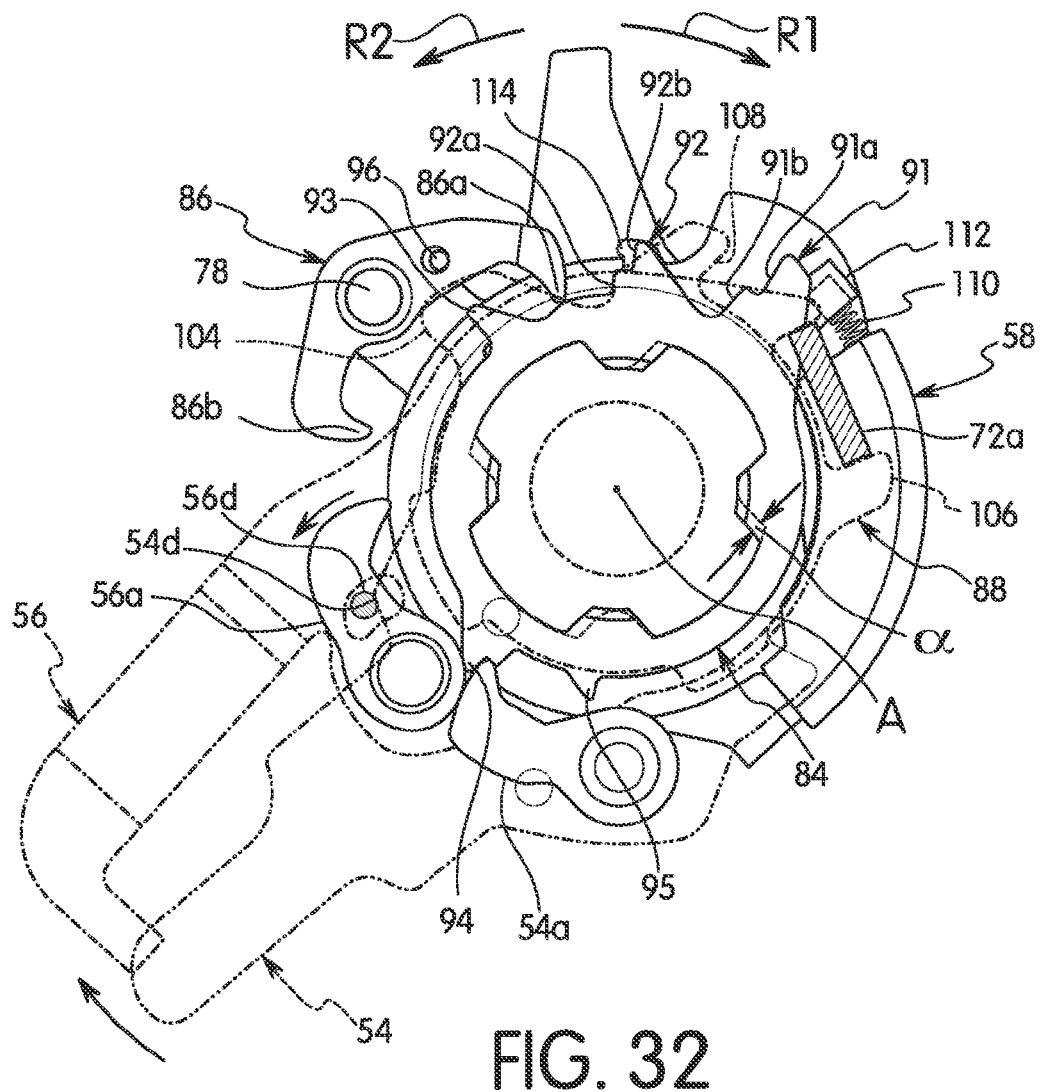
FIG. 32 is a front side elevational view of the selected parts of the shift operating unit illustrated in FIGS. 19 to 31, but with the pull actuation member being rotated from the rest position of FIG. 19 to perform a shifting (pulling) operation from the first low guiding position (the innermost position) directly to the second top guiding position (outermost position) that pulls an inner wire of a control cable.

As seen in FIG. 24, the shift operating unit 38 is in a fully wound position such that the positioning pawl 86 is contacting the top engaging portion 92a of the positioning tooth 92 of the positioning ratchet 84. As mentioned above, a cable releasing operation of the shift operating unit 38 is performed by the rider pivotally moving the shift lever 36. This pivotal movement of the shift lever 36 is transmitted to the second operating member 56 by the shift lever 36 contacting and pushing a contact flange of the second operating member 56 such that the second operating member 56 is rotated in the first rotational direction R1 from its rest position (FIG. 24 or 26) to its releasing position (FIG. 25, 27 or 28).

As the second operating member 56 rotates in the first rotational direction R1 during a cable releasing operation of the shift operating unit 38, the release pawl 56a engages the first contact part 102 of the releasing member 88 to move the releasing member 88 in response to the movement of the second operating member 56. This movement of the releasing member 88 causes the third contact part 104 to move the positioning pawl 86 out of engagement of the positioning ratchet 84 (FIG. 25, 27 or 28) to allow the cable take-up member 58, the positioning ratchet 84 and the preventing member 90 to rotate in the second rotational direction R2 under the force of the biasing element 62. Once the user releases the shift lever 36, the second operating member 56 will then returned to the rest position by the biasing element 82. In the case of a shift from the top engaging portion 92a to the top-trim engaging portion 92b, the first (holding) tooth 86a will compress the biasing element 110 so that the preventing member 90 will rotate relative to the positioning ratchet 84. In this way, the first (holding) tooth 86a will engage the top-trim engaging portion 92b during a cable releasing operation.

The preventing member 90 will now be discussed in more detail. As best seen in FIGS. 18 to 32, the preventing member 90 is movably arranged with respect to the positioning ratchet 84 such that the preventing member 90 prevents the positioning pawl 86 from engaging the top-trim engaging portion 92b (i.e., one of the intermediate engaging portions) of the positioning ratchet 84 while the winding member (e.g., the first operating member 54 together with the pulling pawl 54a and the biasing element 54b) moves the cable take-up member 58 in the first rotational direction R1.

The preventing member 90 is biased in the second rotational direction R2 with respect to the cable take-up member 58 by a biasing element. The biasing element is disposed between the preventing member 90 and the cable take-up member 58 such that the preventing member 90 and the cable take-up member 58 move together as a unit as the winding member (e.g., the first operating member 54 together with the pulling pawl 54a and the biasing element 54b) moves the cable take-up member 58 in the first rotational direction R1.

As best seen in FIG. 18, the preventing member 90 is a rigid ring shaped member having a peripheral edge 90a and a non-circular center opening 90b. The preventing member 90 is fixedly coupled to the cable take-up member 58 to move with the cable take-up member 58 on the main shift axle 60. In particular, the non-circular center opening 90b of the preventing member 90 non-rotatably mates with a projecting hub part 58b such that the cable take-up member 58 and the preventing member 90 move together as a unit on the main shift axle 60. In other words, the preventing member 90 constitutes a preventing member that rotates with the cable take-up member 58.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below", "inner", "outer" and "transverse" as well as any other similar directional terms refer to those directions of a bicycle equipped with the bicycle operating device on a flat horizontal surface. Accordingly, these terms, as utilized to describe the bicycle operating device should be interpreted relative to a bicycle equipped with the bicycle operating device as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
   a fixed member;
   a winding member movably arranged with respect to the fixed member;
   a take-up member movably arranged with respect to the fixed member in a first direction and a second direction that is different from the first direction;
   a positioning member movably arranged with respect to the fixed member such that the positioning member moves between a non-holding position and a holding position that prevents the take-up member from moving in the second direction;
   a positioning ratchet fixedly coupled to the take-up member to move with the take-up member, the positioning ratchet including a first engaging portion that is selectively engaged with the positioning member, a second engaging portion that is selectively engaged with the positioning member and an intermediate engaging portion that is selectively engaged with the positioning member, the intermediate portion being arranged between the first engaging portion and the second engaging portion with respect to the first and second directions, and
   a preventing member movably arranged with respect to the positioning ratchet such that the preventing member prevents the positioning member from engaging the intermediate engaging portion of the positioning ratchet while the winding member moves the take-up member in the first direction.

2. The bicycle operating device according to claim 1, wherein
   the take-up member is rotatably mounted on the fixed member about a rotational axis.

3. The bicycle operating device according to claim 1, wherein
   the preventing member is biased in the second direction with respect to the take-up member by a biasing element.

4. The bicycle operating device according to claim 3, wherein
   the biasing element is disposed between the preventing member and the take-up member such that the preventing member and the take-up member move together as a unit as the winding member moves the take-up member in the first direction.

5. The bicycle operating device according to claim 1, wherein
   the intermediate engaging portion is positioned closer to the second engaging portion than to the first engaging portion.

6. The bicycle operating device according to claim 1, wherein
   the first engaging portion is engaged with the positioning member to establish a first endmost position of the take-up member, and the second engaging portion is engaged with the positioning member to establish a second endmost position of the take-up member.

7. The bicycle operating device according to claim 1, wherein
   the positioning ratchet further includes an additional intermediate engaging portion that is disposed between the first and second engaging portions.

8. The bicycle operating device according to claim 7, wherein the additional intermediate engaging portion is disposed between the first engaging portion and the intermediate engaging portion.

9. The bicycle operating device according to claim 8, wherein the intermediate engaging portion is positioned closer to the second engaging portion than to the additional intermediate engaging portion, and the additional intermediate engaging portion is positioned closer to the first positioning portion than to the intermediate engaging portion.

10. The bicycle operating device according to claim 1, further comprising a releasing member movably arranged with respect to the fixed member between a non-releasing position and a releasing position, the releasing member being arranged relative to the positioning member such that the releasing member disengages the positioning member from the positioning ratchet while the releasing member is at the releasing position.

11. The bicycle operating device according to claim 10, further comprising a stopping member having a stopping tooth, and the stopping member movably mounted with respect to the fixed member between a non-stop position and a stop position to prevent movement of the take-up member in the second direction while the releasing member is at the releasing position.

12. The bicycle operating device according to claim 11, wherein the stopping member and the positioning member are coupled together to move as a unit.

13. The bicycle operating device according to claim 10, wherein the positioning member selectively engages the intermediate engaging portion of the positioning ratchet as the take-up member moves towards the second direction as a result of operation of the releasing member from the non-releasing position to the releasing position.

* * * * *